(12) United States Patent
Kang et al.

(10) Patent No.: US 11,258,170 B2
(45) Date of Patent: Feb. 22, 2022

(54) ELECTRONIC DEVICE COMPRISING ANTENNA

(71) Applicant: Samsung Electronics Co., Ltd., Suwon-si (KR)

(72) Inventors: Woo Suk Kang, Anyang-si (KR); Chae Up Yoo, Seoul (KR); Se Woong Kim, Gimhae-si (KR); Sang Bong Sung, Seongnam-si (KR); Su Min Yun, Incheon (KR); In Young Lee, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 165 days.

(21) Appl. No.: 16/493,494

(22) PCT Filed: Mar. 21, 2018

(86) PCT No.: PCT/KR2018/003302
§ 371 (c)(1),
(2) Date: Sep. 12, 2019

(87) PCT Pub. No.: WO2018/174561
PCT Pub. Date: Sep. 27, 2018

(65) Prior Publication Data
US 2021/0167502 A1 Jun. 3, 2021

(30) Foreign Application Priority Data
Mar. 24, 2017 (KR) .......................... 10-2017-0037528

(51) Int. Cl.
*H01Q 5/378* (2015.01)
*H01Q 1/24* (2006.01)
(Continued)

(52) U.S. Cl.
CPC ............... *H01Q 5/378* (2015.01); *H01Q 1/24* (2013.01); *H01Q 1/44* (2013.01); *H04N 5/225* (2013.01); *H04N 5/2253* (2013.01)

(58) Field of Classification Search
CPC ............ H01Q 5/378; H01Q 1/24; H01Q 1/44; H04N 5/2253; H04N 5/225
(Continued)

(56) References Cited

U.S. PATENT DOCUMENTS 9,337,523 B2 5/2016 Kim et al.
9,549,103 B2 1/2017 Sung et al.
(Continued)

FOREIGN PATENT DOCUMENTS

CN 103594778 A 2/2014
CN 103904427 A 7/2014
(Continued)

OTHER PUBLICATIONS

Chinese Office Action dated Jul. 27, 2020, issued in Chinese Application No. 201880018980.4.
(Continued)

*Primary Examiner* — Hai V Tran
(74) *Attorney, Agent, or Firm* — Jefferson IP Law, LLP

(57) ABSTRACT

An electronic device according to an embodiment of the present invention may comprise: a housing having an opening formed therein; a printed circuit board (PCB) arranged inside the housing; an insulating member coupled to the PCB; a first radiator formed on the insulating member; a camera electrically connected to the PCB so as to take an image through the opening; a decoration surrounding the opening; a second radiator comprising at least a part of the decoration; and a communication circuit for feeding the first radiator.

7 Claims, 27 Drawing Sheets

(51) Int. Cl.
*H01Q 1/44* (2006.01)
*H04N 5/225* (2006.01)

(58) Field of Classification Search
USPC .......................................................... 343/720
See application file for complete search history.

(56) References Cited

U.S. PATENT DOCUMENTS

| | | | | |
|---|---|---|---|---|
| 2003/0202097 | A1* | 10/2003 | Kallhammer | G02B 23/12 |
| | | | | 348/148 |
| 2011/0128201 | A1 | 6/2011 | Ju et al. | |
| 2013/0241795 | A1* | 9/2013 | Sung | H01Q 1/50 |
| | | | | 343/861 |
| 2014/0240581 | A1* | 8/2014 | Sung | G03B 17/02 |
| | | | | 348/335 |
| 2014/0340576 | A1* | 11/2014 | Kim | H01Q 1/44 |
| | | | | 348/375 |
| 2016/0056545 | A1 | 2/2016 | Park et al. | |
| 2016/0285151 | A1* | 9/2016 | Lee | H01Q 5/321 |
| 2016/0323428 | A1* | 11/2016 | Kim | H04M 1/72412 |
| 2017/0033449 | A1* | 2/2017 | Talty | H01Q 21/28 |
| 2018/0261912 | A1* | 9/2018 | Mizuno | H01Q 1/32 |

FOREIGN PATENT DOCUMENTS

| | | |
|---|---|---|
| CN | 203747020 U | 7/2014 |
| CN | 104009280 A | 8/2014 |
| CN | 105375108 A | 3/2016 |
| EP | 2 772 987 A2 | 9/2014 |
| KR | 10-2006-0097415 A | 9/2006 |
| KR | 10-1049572 B1 | 7/2011 |
| KR | 10-1174699 B1 | 8/2012 |
| KR | 10-1240353 B1 | 3/2013 |
| KR | 10-2014-0107145 A | 9/2014 |
| KR | 10-2016-0024428 A | 3/2016 |
| KR | 10-2016-0084745 A | 7/2016 |

OTHER PUBLICATIONS

Extended European Search Report dated Nov. 29, 2019, issued in European Application No. 18771403.5.

* cited by examiner

ELECTRONIC DEVICE COMPRISING ANTENNA

TECHNICAL FIELD

Embodiments of the disclosure relates to a technology for improving performance of an antenna.

BACKGROUND ART

As mobile communication technologies develop, there is being widely supplied an electronic device such as a smartphone or a wearable device. The electronic device may communicate with another electronic device. For example, the electronic device may transmit/receive a message, a photo, a video, or the like to/from the another electronic device. To this end, an antenna capable of communicating with the another electronic device may be mounted on the electronic device.

DISCLOSURE

Technical Problem

The electronic device may include other metal components as well as the antenna. For example, the electronic device may include a metal housing for protecting the electronic device from external impact.

However, the above metal components may reduce performance of an antenna. For example, a signal radiated through the antenna is induced at the metal components, and a transmission efficiency of the antenna may decrease. For example, a signal received from another electronic device, which can be induced at the metal components, may degrade a reception efficiency of the antenna.

Various embodiments of the disclosure provide an electronic device for solving the above-described problems brought up in this specification.

Technical Solution

An electronic device according to an embodiment of the disclosure may include a housing where an opening is formed, a printed circuit board (PCB) that is disposed in the housing, an insulating member that is coupled to the PCB, a first radiator that is formed on the insulating member, a camera that is electrically connected with the PCB and photographs the image through the opening, a decoration that surrounds the opening, a second radiator that includes at least a portion of the decoration, and a communication circuit that feeds a power to the first radiator, and the communication circuit may indirectly feed the power to the second radiator through the first radiator and may transmit/receive a signal in a specified frequency band through an electrical path formed by the first radiator and the second radiator.

Also, an electronic device according to an embodiment of the disclosure may include a housing where an opening is formed, a printed circuit board (PCB) that is disposed in the housing, an insulating member that is coupled to the PCB, a first radiator that is formed on the insulating member, a camera that is electrically connected with the PCB and is exposed through the opening, a decoration that surrounds the opening, a flexible printed circuit board (FPCB) that includes one end located between the first radiator and the decoration and an opposite end electrically connected with a ground layer in the PCB, a second radiator that includes at least a portion of the FPCB, a third radiator that includes at least a portion of the decoration, and a communication circuit that feeds a power to the first radiator, and the communication circuit may indirectly feed a power to the second radiator and the third radiator through the first radiator and may transmit/receive a signal in a specified frequency band through an electrical path formed by the first radiator, the second radiator, and the third radiator.

Also, an electronic device according to an embodiment of the disclosure may include a housing, a first annular structure that is formed of a conductive material at a first region of the housing, a transparent plate that faces a first direction and fills the annular structure, a first camera module that is located in the housing and includes an image sensor facing the transparent plate, a physical button that is exposed through a second region of the housing and faces a second direction different from the first direction, a printed circuit board (PCB) that is located in the housing so as to be parallel to the transparent plate, an elongated flexible PCB that electrically connects the button and the PCB so as to surround a portion of the PCB and includes an elongated conductive layer electromagnetically connected with the annular structure by a coupling, a wireless communication circuit that is mounted on the PCB, and a conductive pattern that is located in the housing and is electrically connected with the communication circuit, the first camera module may be located between the transparent plate and the PCB, and a portion of the elongated conductive layer may be located between the conductive pattern and the annular structure.

Advantageous Effects

According to embodiments of the disclosure, performance of an antenna may be improved.

Besides, a variety of effects directly or indirectly understood through this disclosure may be provided.

MODE FOR INVENTION

Figure 1A:
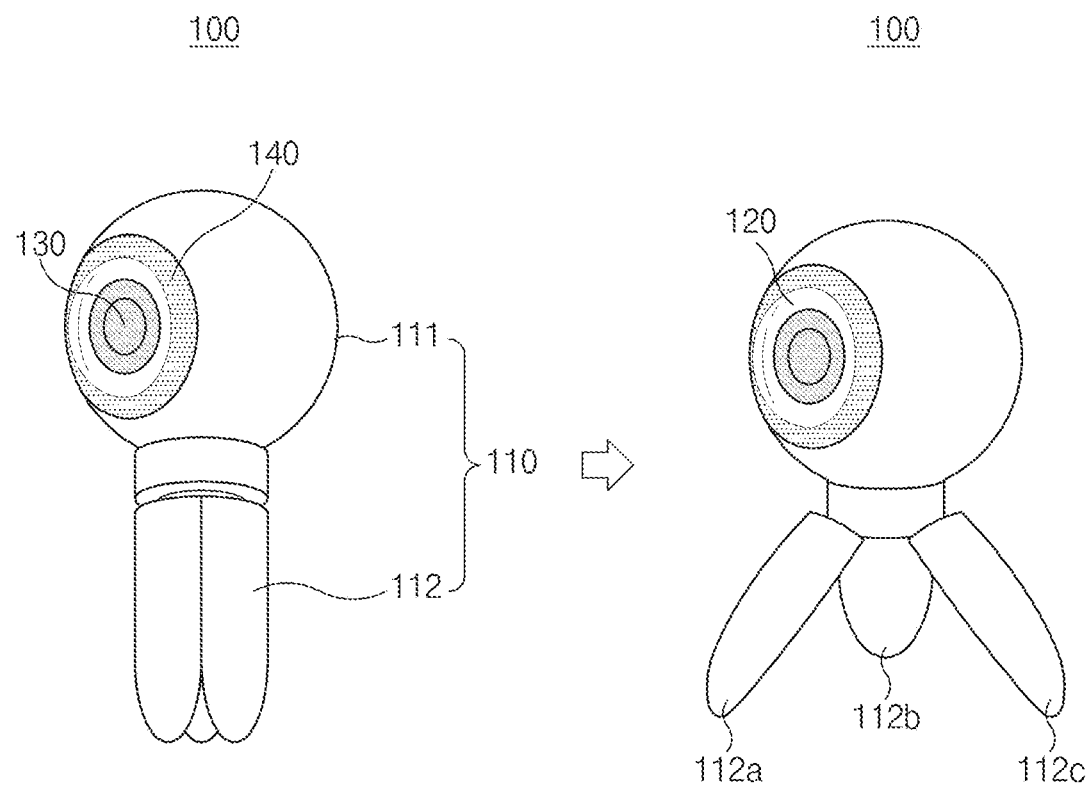
FIG. 1A illustrates an electronic device according to an embodiment.

FIG. 1A illustrates an electronic device according to an embodiment.

Referring to FIG. 1A, an electronic device 100 (e.g., a 360° camera) may include a housing 110, a cover glass 120, or a camera 130.

According to an embodiment, the housing 110 may form the exterior of the electronic device 100. For example, the housing 110 may include a head 111 and a body 112. Various kinds of components (e.g., the camera 130) included in the electronic device 100 may be mounted on the head 111. For example, the head 111 may be formed of tempered glass, reinforced plastic, or the like and may protect the various kinds of components from external impact. According to an embodiment, an opening may be formed in a partial region of the head 111 such that the camera 130 is exposed. According to an embodiment, at least a portion of the head 111 may include a conductive material. For example, the head 111 may include a decoration (e.g., a ring) 140 that includes a conductive material surrounding the opening. For example, at least a portion of the decoration 140 may be formed of metal. The at least a portion of the decoration 140, which is formed of metal, may operate as a radiator of an antenna for transmitting/receiving a signal in a specified frequency band.

According to an embodiment, the body 112 may support the head 111. For example, as illustrated on the right of FIG. 1A, the body 112 may include a plurality of supports 112a, 112b, and 112c. The plurality of supports 112a, 112b, and 112c may be spread at a specified angle. In this case, the plurality of supports 112a, 112b, and 112c may be fixed on a ground, and thus, the body 112 may support the head 111.

According to an embodiment, the cover glass 120 may be coupled to the housing 110 (e.g., fitted with the opening formed at the head 111). The cover glass 120 may be formed of tempered glass or transparent plastic such that the camera 130 is able to photograph an image. In the specification, the cover glass 120 may be also referred to as a "glass window".

According to an embodiment, the camera 130 may be exposed through the opening and the cover glass 120. The camera 130 may photograph an image through the cover glass 120. For example, the camera 130 may be a 360° camera 130 that is able to photograph an ambient environment of the electronic device 100 at all angles.

Figure 1B:
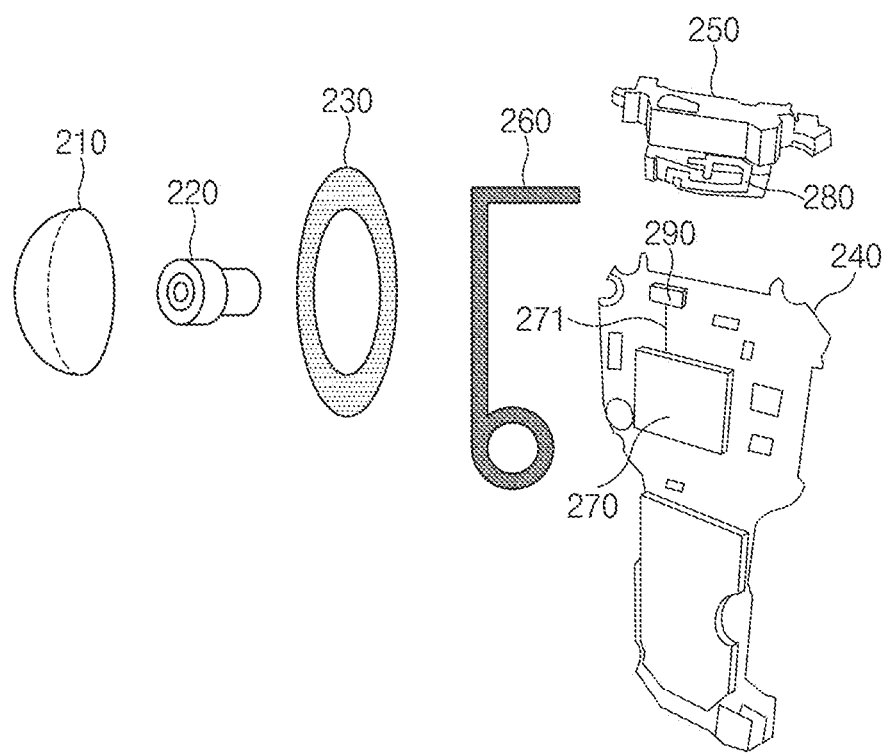
FIG. 1B is an exploded perspective view of an electronic device according to an embodiment.

FIG. 1B is an exploded perspective view of an electronic device according to an embodiment. Components illustrated in FIG. 1B indicate some components of the electronic device 100 illustrated in FIG. 1A.

Referring to FIG. 1B, an electronic device 200 (e.g., the electronic device 100 of FIG. 1A) may include a cover glass 210, a camera 220, a decoration 230, a printed circuit board (PCB) 240, an insulating member 250, a flexible printed circuit board (FPCB) 260, a communication circuit 270, and a feed unit 290. Unless otherwise defined, the description given with regard to the cover glass 120, the camera 130, and the decoration 140 illustrated in FIG. 1A may be applied to the cover glass 210, the camera 220, and the decoration 230 illustrated in FIG. 1B.

According to an embodiment, various kinds of components included in the electronic device 200 may be mounted on the PCB 240. For example, the camera 220 or the communication circuit 270 may be mounted on the PCB 240. The PCB 240 may be referred to as a "main board" or "printed board assembly (PBA)".

According to an embodiment, the insulating member 250 may be a component that is coupled to the PCB 240. In the specification, the insulating member 250 may be referred to as a "carrier".

According to an embodiment, a radiator 280 may be disposed on a surface of the insulating member 250. For example, the radiator 280 may be patterned on an opposite side of a surface of the insulating member 250, which is coupled to the PCB 240. The radiator 280 patterned on the insulating member 250 may be referred to as a "laser direct structuring (LDS) radiator".

According to an embodiment, the FPCB 260 may include a wiring structure so as to be electrically connected with a ground layer in the PCB 240. For example, one end of the FPCB 260 may be connected with the ground layer, and an opposite end of the FPCB 260 may be connected with the insulating member 250. According to an embodiment, at least a portion of the FPCB 260 may operate as a radiator.

According to an embodiment, the communication circuit 270 may be disposed on the PCB 240. In the case where the insulating member 250 is coupled to the PCB 240, the communication circuit 270 may be electrically connected with a radiator (hereinafter referred to as a "first radiator 280") patterned on the insulating member 250. For example, the communication circuit 270 may be electrically connected with the first radiator 280 at the feed unit 290 through a feed line 271 and a feed member (not illustrated) (e.g., a C-clip). The communication circuit 270 may indirectly feed a power to a radiator (hereinafter referred to as a "second radiator") including at least a portion of the FPCB 260 and a radiator (hereinafter referred to as a "third radiator") including at least a portion of the decoration 230. When the respective radiators are fed or indirectly fed with the power, the communication circuit 270 may transmit/receive a signal in a specified frequency band through an electrical path that is formed by the first radiator 280, the second radiator, and/or the third radiator. According to an embodiment of the disclosure, the performance of antenna may be improved by feeding or indirectly feeding the power to the first radiator 280, the second radiator, and/or the third radiator.

In the specification, the "feeding the power" may mean an operation in which the communication circuit 270 applies a radiation current to the first radiator 280. The "indirectly feeding the power" may mean an operation in which the communication circuit 270 allows a radiation current to flow at the first radiator 280 and thus the radiator current flows at the second radiator and/or the third radiator by the coupling. The "electrical path" may mean a path through which an antenna transmits/receives a signal.

Figure 2:
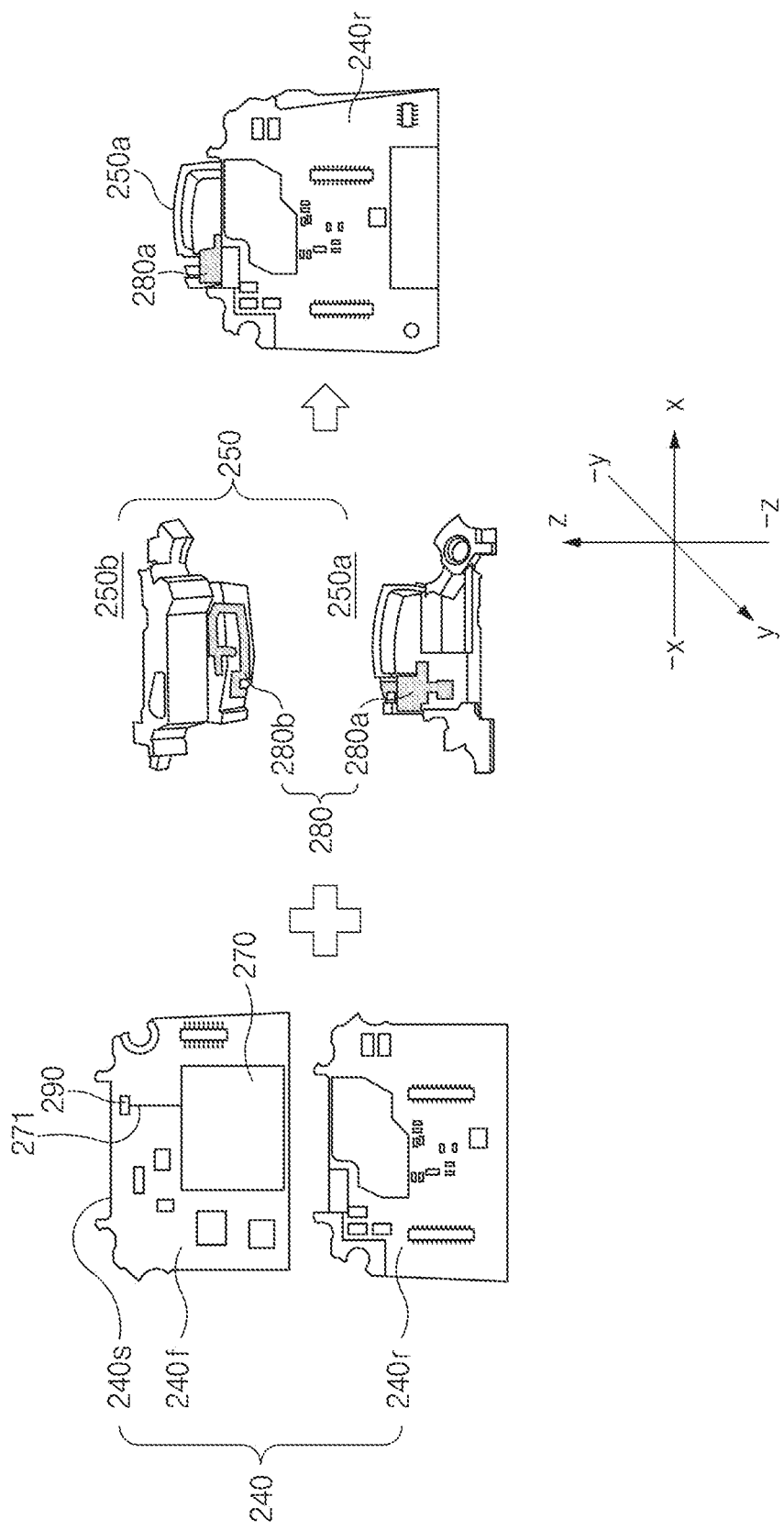
FIG. 2 is a view illustrating how a PCB and an insulating member are coupled, according to an embodiment.

FIG. 2 is a view illustrating how a PCB and an insulating member are coupled, according to an embodiment. In the disclosure, the description given with reference to FIG. 1B may be identically applied to components that have the same reference numerals/marks as components illustrated in FIG. 1B.

Referring to FIG. 2, the PCB 240 may include a first surface 240*f*, a second surface 240*r*, and a side surface 240*s*. The first surface 240*f* may mean, for example, a surface coupled to the camera 220. The second surface 240*r* may be a surface that is substantially parallel to the first surface 240*f* and faces away from the first surface 240*f*. For example, the first surface 240*f* and the second surface 240*r* may be referred to as a "front surface" and a "rear surface" of the PCB 240, respectively. The side surface 240*s* may be a surface that surrounds a space between the first surface 240*f* and the second surface 240*r*.

According to an embodiment, the insulating member 250 may be coupled to at least a portion of the side surface 240*s* of the PCB 240. For example, the insulating member 250 may be coupled in a z-direction of the PCB 240 in a state where the first surface 240*f* or the second surface 240*r* faces a y-direction. A lower portion 250*a* of the insulating member 250 may be a portion facing the same direction as the second surface 240*r* when the insulating member 250 is coupled to the PCB 240. An upper portion 250*b* of the insulating member 250 may be a portion facing the same direction as the first surface 240*f* when the insulating member 250 is coupled to the PCB 240.

According to an embodiment, the first radiator 280 may include a patch pattern 280*a* and a conductive line 280*b*. For example, the patch pattern 280*a* may be a component patterned on the lower portion 250*a* of the insulating member. The conductive line 280*b* may be a component patterned from the patch pattern 280*a* to the upper portion 250*b* of the insulating member. The first radiator 280 may be, for example, a single component included in the electronic device 200. However, for convenience of description, it is assumed that the first radiator 280 includes the patch pattern 280*a* and the conductive line 280*b* as described above.

According to an embodiment, the communication circuit 270 may feed the power to the first radiator 280 through the feed line 271. An antenna that is implemented with a feed point (e.g., a point where the feed line 271 and the patch pattern 280*a* are connected) and the first radiator 280 may transmit/receive a signal in a specified frequency band. For example, in the case where the first radiator 280 includes the patch pattern 280*a*, the antenna implemented with the feed point and the patch pattern 280*a* may transmit/receive a signal in a 5 GHz band. For another example, in the case where the first radiator 280 includes the patch pattern 280*a* and the conductive line 280*b*, the antenna implemented with the feed point, the patch pattern 280*a*, and the conductive line 280*b* may transmit/receive signals in a 2.4 GHz band and the 5 GHz band.

Figure 3:
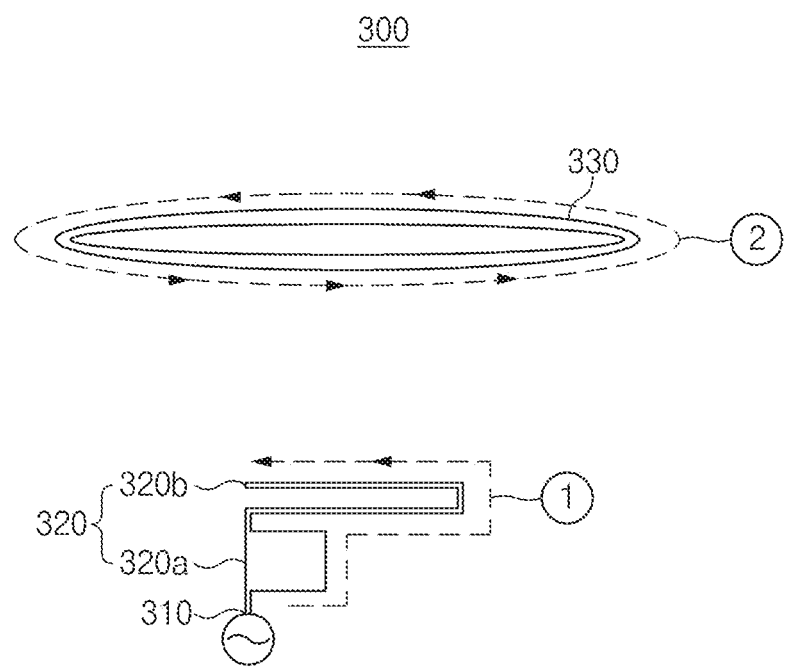
FIG. 3 illustrates an antenna according to an embodiment.

FIG. 3 illustrates an antenna according to an embodiment. FIG. 3 illustrates a simplified view of a feed point 310, a first radiator 320, and a third radiator 330. An antenna 300 illustrated in FIG. 3 may include the feed point 310, the first radiator 320 (e.g., the first radiator 280), and the third radiator 330. In the specification, the feed point 310 may mean a point where the feed line 271 illustrated in FIG. 2 and a patch pattern 320*a* (e.g., the patch pattern 280*a*) are connected.

According to an embodiment, the communication circuit 270 may feed the power to the first radiator 320 (or the patch pattern 320*a*). A fed radiation current may flow along a first path ①(e.g., from the patch pattern 320*a* to a conductive line 320*b*). For example, the antenna 300 may transmit/receive a signal in an approximately 5 GHz band through an electrical path formed by the patch pattern 320*a* and may transmit/receive a signal in an approximately 2.4 GHz band through an electrical path formed by the conductive line 320*b*.

According to an embodiment, when a radiation current flows at the first radiator 320, the first radiator 320 and the third radiator 330 may be electromagnetically connected by the coupling. For example, when a radiation current flows at the first radiator 320, an electromagnetic field may be formed about the first radiator 320. The electromagnetic field may allow a radiation current to flow at the third radiator 330 (e.g., to flow along a second path ②). In this case, a direction of the radiation current flowing at the first radiator 320 may be opposite to a direction of the radiation current flowing at the third radiator 330. When the radiation current flows at the first radiator 320 and the third radiator 330, the antenna 300 may transmit/receive a signal in a specified frequency band (e.g., 2.4 GHz/5 GHz).

Figure 4:
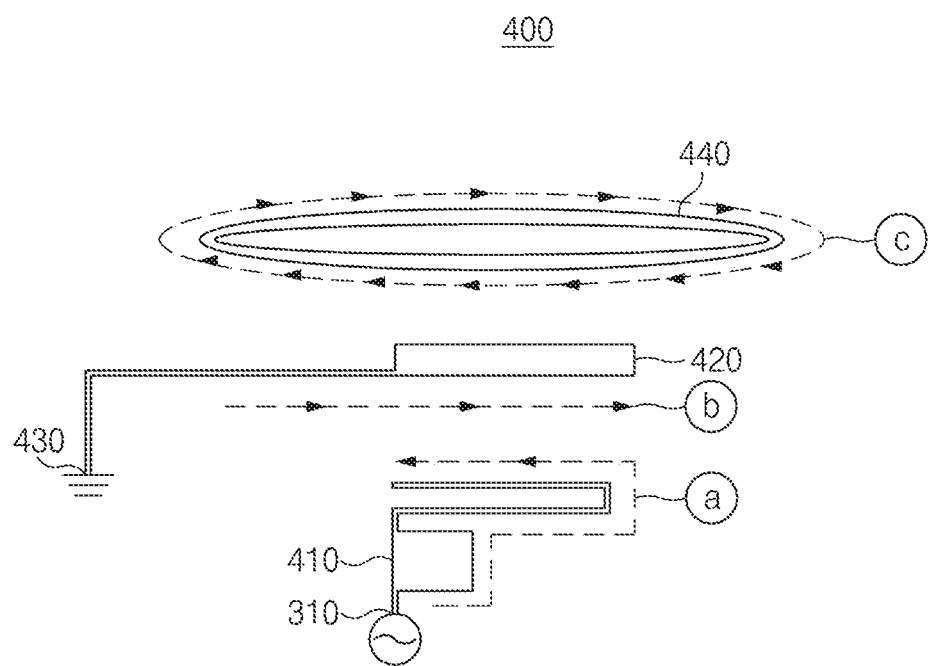
FIG. 4 illustrates an antenna according to another embodiment.

FIG. 4 illustrates an antenna according to another embodiment. An antenna 400 illustrated in FIG. 4 may include the feed point 310, a first radiator 410, a second radiator 420, a third radiator 440, and a ground point 430. In the specification, the ground point 430 may be a point where a ground layer in a PCB and the second radiator 420 are connected.

Referring to FIG. 4, a communication circuit (e.g., the communication circuit 270 illustrated in FIG. 2) may feed a power to the first radiator 410. A fed radiation current may flow along an "a" path ⓐ.

According to an embodiment, when the radiation current flows at the first radiator 410, the first radiator 410 and the second radiator 420 may be electromagnetically connected by the coupling. As such, the radiation current may flow at the second radiator 420. For example, the radiation current may flow at the second radiator 420 along a "b" path ⓑ. In this case, a direction of the radiation current flowing at the first radiator 410 may be opposite to a direction of the radiation current flowing at the second radiator 420. The indirect feed (or feeding) process by the coupling described with reference to FIG. 3 may be applied to the first radiator 410 and the second radiator 420.

According to an embodiment, when the radiation current flows at the second radiator 420, the second radiator 420 and the third radiator 440 may be electromagnetically connected by the coupling. As such, the radiation current may flow at the third radiator 440. For example, the radiation current may flow at the third radiator 440 along a "c" path ⓒ. In this case, the direction of the radiation current flowing at the first radiator 410 may be substantially identical to a direction of the radiation current flowing at the third radiator 440.

According to an embodiment, when the radiation current flows at the first radiator 410, the second radiator 420, and the third radiator 440, the antenna 400 may transmit/receive a signal in a specified frequency band (e.g., 2.4 GHz/5 GHz).

Comparing the antenna 300 illustrated in FIG. 3 and the antenna 400 illustrated in FIG. 4, the radiation current may also flow at the second radiator 420 of the antenna 400. Also, the direction of the radiation current flowing at the third radiator 440 of the antenna 400 may be substantially identical to the direction of the radiation current flowing at the first radiator 410. As such, an electromagnetic field around the antenna 400 may become strong, and the antenna 400 may have an improved radiation efficiency compared with the antenna 300.

Figure 5:
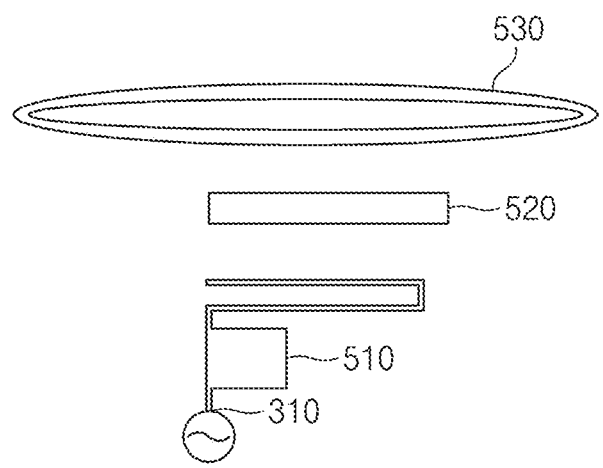
FIG. 5 illustrates an antenna according to another embodiment.

FIG. 5 illustrates an antenna according to another embodiment. An antenna 500 illustrated in FIG. 5 may include the feed point 310, a first radiator 510, a second radiator 520, or a third radiator 530.

Referring to FIG. 5, the second radiator 520 may not be grounded. For example, the second radiator 520 may be interposed between the first radiator 510 and the third radiator 530. The second radiator 520 may be disposed on the insulating member 250. Because the second radiator 520 is not grounded and is disposed on the insulating member 250, the second radiator 520 may be shorter in length than the second radiator 420.

Comparing the antenna 400 illustrated in FIG. 4 and the antenna 500 illustrated in FIG. 5, because the length of the second radiator 520 decreases, an electrical path of the antenna 500 may also become short compared with the antenna 400. Accordingly, the antenna 500 may have a higher resonant frequency than the antenna 400.

Figure 6:
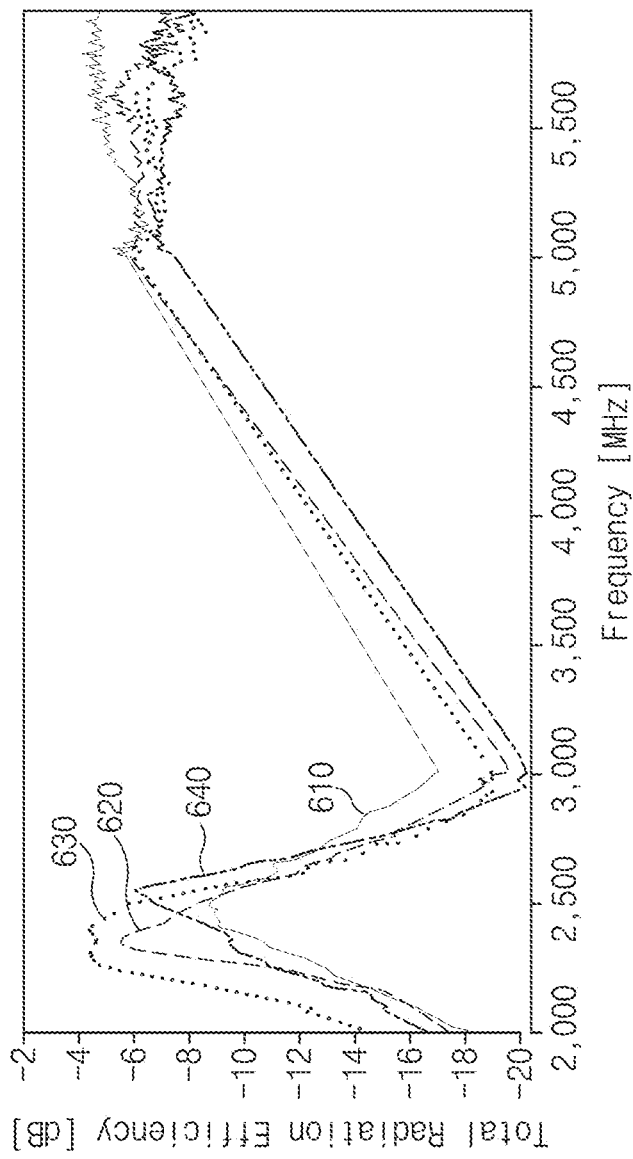
FIG. 6 illustrates radiation efficiencies of antennas according to various embodiments.

FIG. 6 illustrates radiation efficiencies of antennas according to various embodiments. Graphs illustrated in FIG. 6 indicate radiation efficiencies of the antennas 300, 400, and 500 illustrated in FIGS. 3 to 5. An antenna according to a comparative example is, for example, an antenna including the feed point 310 and the first radiator 320.

Referring to FIG. 6, a first graph 610 indicates a radiation efficiency of the antenna according to the comparative example, a second graph 620 indicates a radiation efficiency of the antenna 300 illustrated in FIG. 3, a third graph 630 indicates a radiation efficiency of the antenna 400 illustrated in FIG. 4, and a fourth graph 640 indicates a radiation efficiency of the antenna 500 illustrated in FIG. 5. Comparing the first graph 610 and the second graph 620, unlike the antenna according to the comparative example, because a radiation current flows at the third radiator 330 of the antenna 300 illustrated in FIG. 3, a radiation efficiency may be improved as much as 3 dB in the 2.4 GHz band.

Comparing the second graph 620 and the third graph 630, unlike the antenna 300 illustrated in FIG. 3, a radiation current may flow at the second radiator 420 of the antenna 400 illustrated in FIG. 4. Also, a direction of the radiation current flowing at the third radiator 440 may be substantially identical to a direction of the radiation current flowing at the first radiator 410. as such, in the case of the antenna 400 illustrated in FIG. 4, a radiation efficiency may be improved as much as 2 dB at the 2.4 GHz band compared with the antenna 300 illustrated in FIG. 3.

Comparing the third graph 630 and the fourth graph 640, as described with reference to FIG. 5, because a length of the second radiator 520 becomes short, a resonant frequency may vary. For example, a resonant frequency of the antenna 400 illustrated in FIG. 4 may be around approximately 2.4 GHz, and a resonant frequency of the antenna 500 illustrated in FIG. 5 may be around approximately 2.5 GHz.

Figure 7:
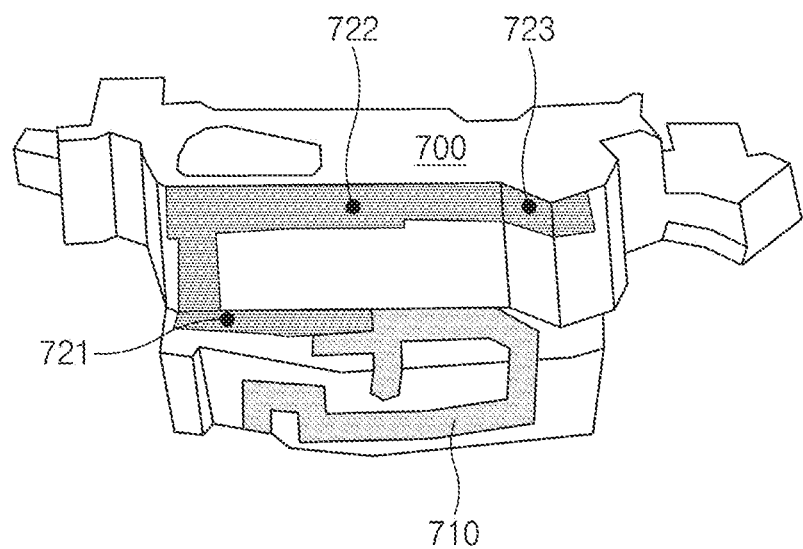
FIG. 7 illustrates an insulating member and a first radiator according to an embodiment.
Figure 8:
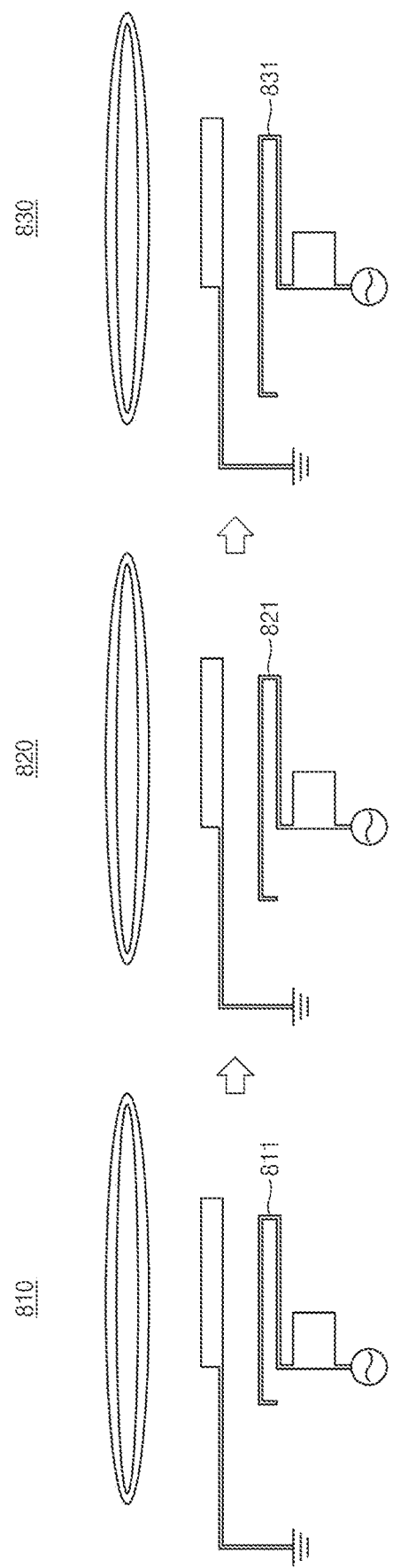
FIG. 8 illustrates antennas in which a length of a first radiator gradually increases, according to various embodiments.
Figure 9:
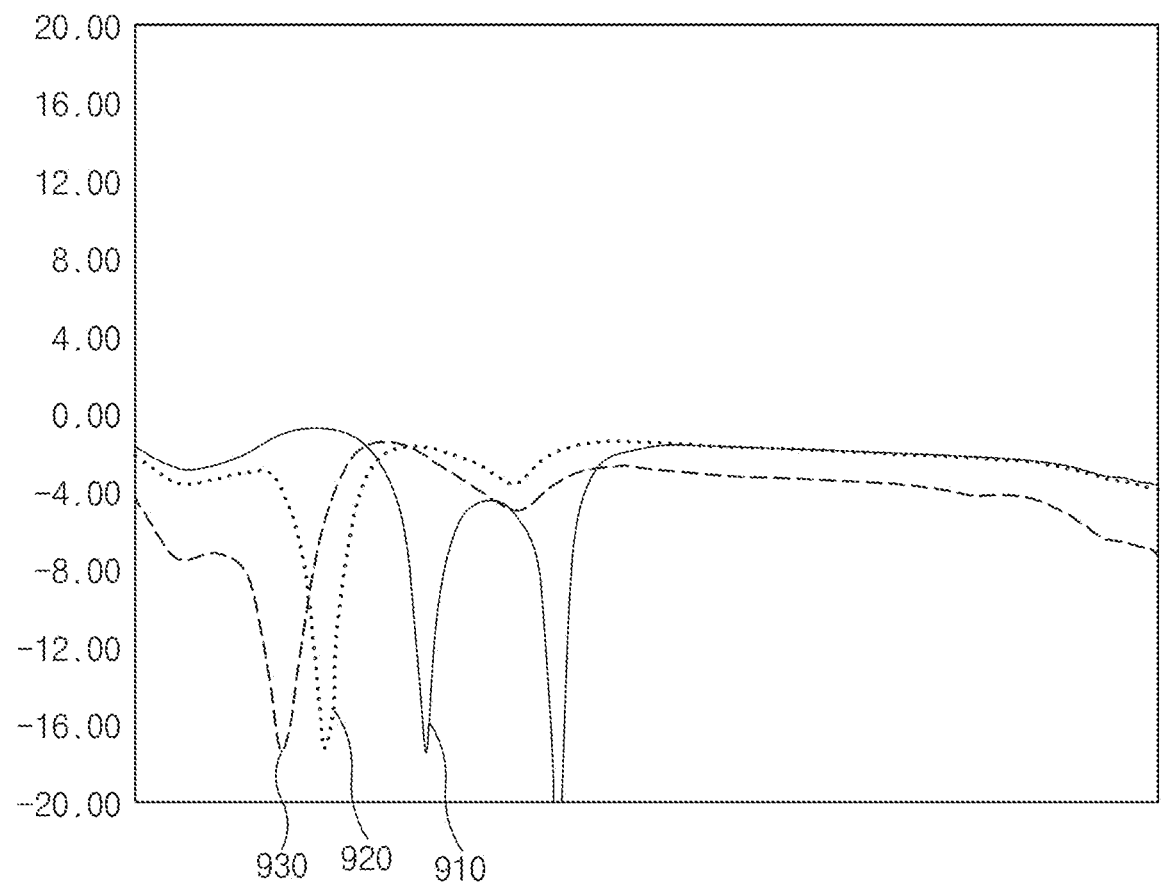
FIG. 9 illustrates reflection coefficients of antennas according to various embodiments.

FIG. 7 illustrates an insulating member and a first radiator according to an embodiment. FIG. 8 illustrates antennas in which a length of a first radiator gradually increases, according to various embodiments. Antennas 810, 820, and 830 illustrated in FIG. 8 indicate antennas where an electrical path is changed as a length of a first radiator 710 illustrated in FIG. 7 is changed. FIG. 9 illustrates reflection coefficients of antennas according to various embodiments. Graphs illustrated in FIG. 9 indicate reflection coefficients of the antennas 810, 820, and 830 illustrated in FIG. 8.

Referring to FIG. 7, the first radiator 710 may be extended on an insulating member 700. For example, the first radiator 710 may be patterned up to a first point 721, a second point 722, or a third point 723 on the insulating member 700 In the case where the first radiator 710 is patterned up to the first point 721, the second point 722, or the third point 723, a length of the first radiator 710 may also gradually become long. The first point 721, the second point 722, or the third point 723 may mean any point on the insulating member 700.

Referring to FIGS. 7 and 8, a first radiator 811 may correspond to the case where the first radiator 710 is extended up to the first point 721, a first radiator 821 to the case where the first radiator 710 is extended up to the second point 722, and a first radiator 831 to the case where the first radiator 710 is extended up to the third point 723. According to the embodiments illustrated in FIG. 8, as a length of the first radiator 710 increases, electrical paths of the antennas 810, 820, and 830 may vary. For example, the first radiator 821 may be longer than the first radiator 811. Also, the first radiator 831 may be longer than the first radiator 821.

According to an embodiment, because a length of the first radiator 821 is longer than a length of the first radiator 811, an electrical path of the antenna 820 may be longer than that of the antenna 810. Also, because a length of the first radiator 831 is longer than the length of the first radiator 821, an electrical path of the antenna 830 may be longer than that of the antenna 820.

According to an embodiment, because the electrical paths of the antennas 810, 820, and 830 gradually become long, resonant frequencies of the antennas 810, 820, and 830 may gradually become low. Referring to FIG. 9, a graph 910 indicates a reflection coefficient of the antenna 810, a graph 920 indicates a reflection coefficient of the antenna 820, and a graph 930 indicates a reflection coefficient of the antenna 830. Comparing the graph 910 and the graph 920, because an electrical path of the antenna 820 is longer than an electrical path of the antenna 810, a resonant frequency of the antenna 820 may be lower than a resonant frequency of the antenna 810. For example, the resonant frequency of the antenna 810 may be 900 MHz, and the resonant frequency of the antenna 820 may be 800 MHz. Comparing the graph 920 and the graph 930, because an electrical path of the antenna 830 is longer than the electrical path of the antenna 820, a resonant frequency of the antenna 830 may be lower than the resonant frequency of the antenna 820. For example, the resonant frequency of the antenna 820 may be 800 MHz, and the resonant frequency of the antenna 830 may be 700 MHz.

Figure 10:
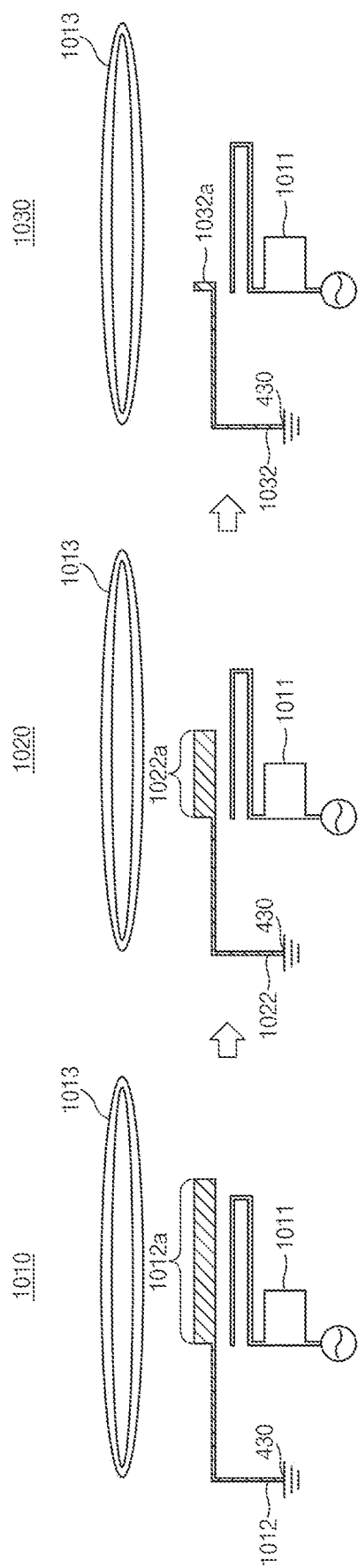
FIG. 10 illustrates antennas in which a length of one end of a second radiator is changed, according to various embodiments.
Figure 11:
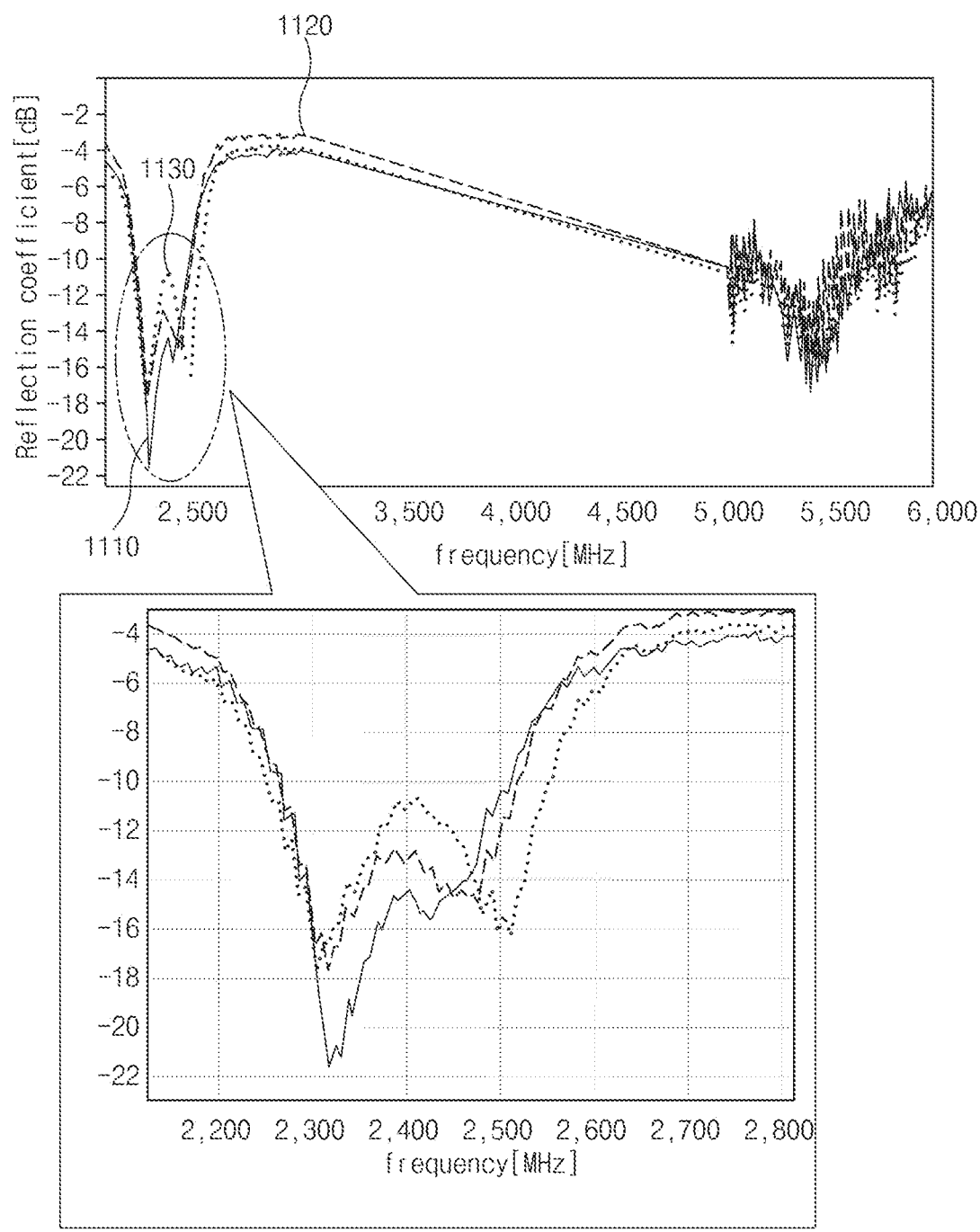
FIG. 11 illustrates reflection coefficients of antennas according to various embodiments.

FIG. 10 illustrates antennas in which a length of one end of a second radiator is changed, according to various embodiments. FIG. 11 illustrates reflection coefficients of antennas according to various embodiments. Graphs illustrated in FIG. 11 may mean reflection coefficients of antennas 1010, 1020, and 1030 illustrated in FIG. 10.

Referring to FIG. 10, one end of a second radiator 1012/1022/1032 may be connected with the ground point 430, and an opposite end 1012a/1022a/1032a of the second radiator 1012/1022/1032 may be interposed between a first radiator 1011 and a third radiator 1013. According to the embodiments illustrated in FIG. 10, a length of the opposite end 1012a/1022a/1032a may be changed. For example, a length of the opposite end 1012a/1022a/1032a may become gradually short. As the length of the opposite end 1012a gradually decreases, the total length of the second radiator 1012/1022/1032 may gradually decrease. As such, electrical paths of the antennas 1010, 1020, and 1030 may also become short. For example, because the length of the opposite end 1022a is shorter than the length of the opposite end 1012a, an electrical path of the antenna 1020 may be shorter than an electrical path of the antenna 1010. Because the length of the opposite end 1032a is shorter than the length of the opposite end 1022a, an electrical path of the antenna 1030 may be shorter than the electrical path of the antenna 1020.

According to an embodiment, because the electrical paths of the antennas 1010, 1020, and 1030 gradually become short, resonant frequencies of the antennas 1010, 1020, and 1030 may gradually become high. Referring to FIG. 11, a graph 1110 indicates a reflection coefficient of the antenna 1010, a graph 1120 indicates a reflection coefficient of the antenna 1020, and a graph 1130 indicates a reflection coefficient of the antenna 1030. Comparing the graph 1110 and the graph 1120, the resonant frequency of the antenna 1020 may be higher than the resonant frequency of the antenna 1010. Comparing the graph 1120 and the graph 1130, the resonant frequency of the antenna 1030 may be higher than the resonant frequency of the antenna 1020.

According to an embodiment, as the electrical paths and the coupling areas of the antennas 1010, 1020, and 1030 are changed, the resonant frequencies of the antennas 1010, 1020, and 1030 may be changed. Also, due to the mapping effect, bandwidths of the antennas 1010, 1020, and 1030 may increase. For example, the bandwidth of the antenna 1010 may be approximately 120 MHz, while the bandwidth of the antenna 1020 and the bandwidth of the antenna 1030 may be 180 MHz and 200 MHz, respectively. In the case where the bandwidths of the antennas 1010, 1020, and 1030 increase, the signal transmission/reception performance of the antennas 1010, 1020, and 1030 may be improved.

Figure 12:
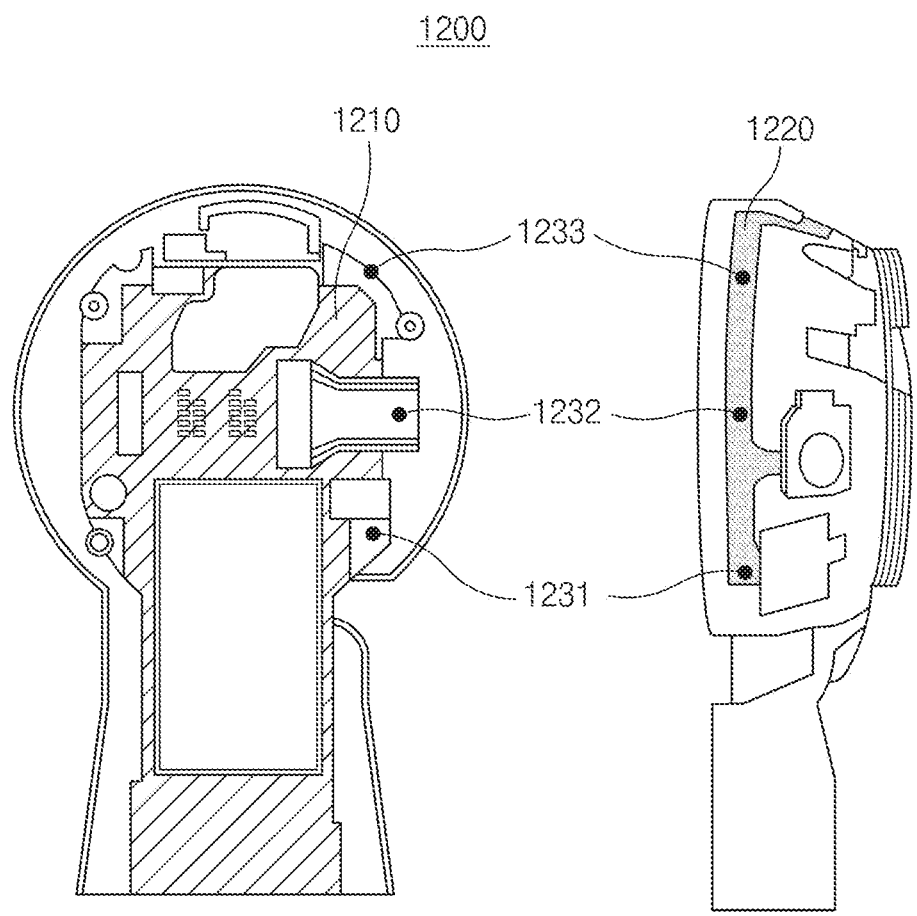
FIG. 12 illustrates locations of a second radiator and a ground point according to various embodiments.
Figure 13:
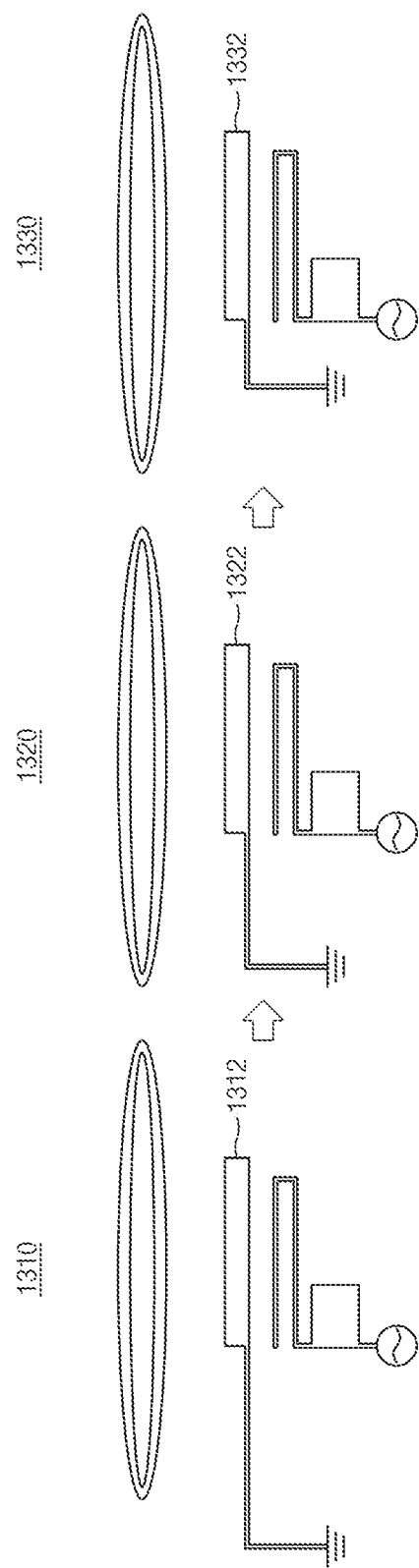
FIG. 13 illustrates antennas in which a length of a second radiator gradually decreases, according to various embodiments.
Figure 14:
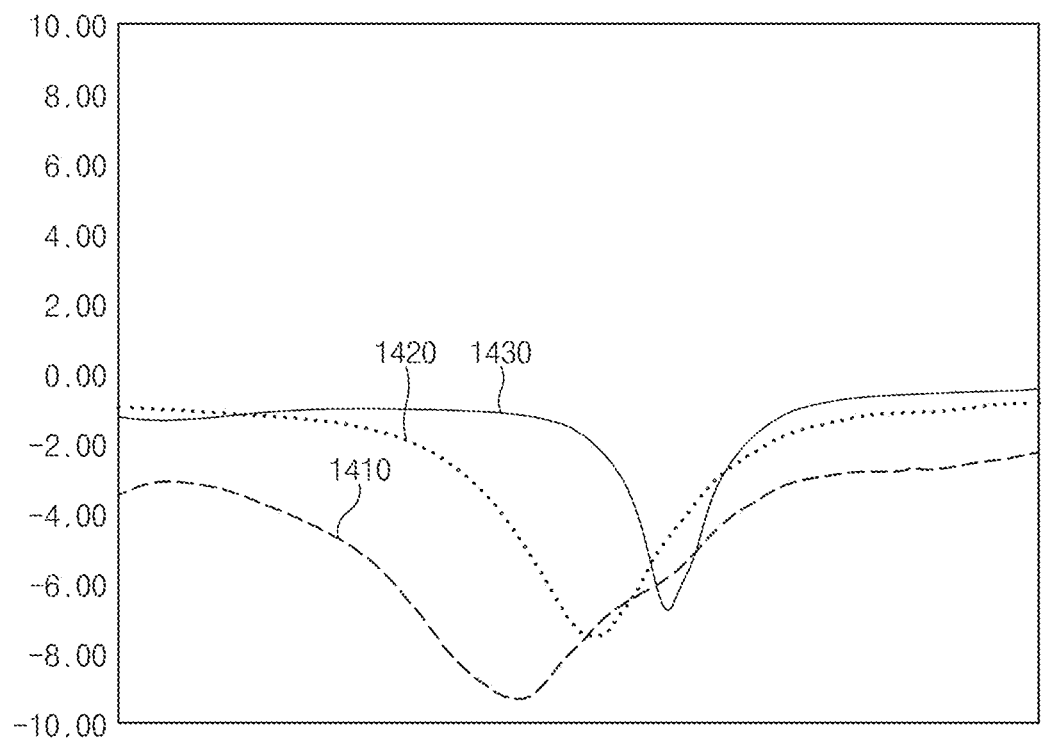
FIG. 14 illustrates reflection coefficients of antennas according to various embodiments.

FIG. 12 illustrates locations of a second radiator and a ground point according to various embodiments. FIG. 13 illustrates antennas in which a length of a second radiator gradually decreases, according to various embodiments. Antennas illustrated in FIG. 13 indicate antennas where an electrical path is changed as a length of a second radiator illustrated in FIG. 12 is changed. FIG. 14 illustrates reflection coefficients of antennas according to various embodiments. Graphs illustrated in FIG. 14 indicate reflection coefficients of antennas illustrated in FIG. 13.

Referring to FIG. 12, a ground point (e.g., the ground point 430 of FIG. 4) may be changed. For example, a second radiator 1220 may be connected with a ground layer in a PCB 1210 at a first point 1231, a second point 1232, or a third point 1233. In the case where the second radiator 1220 is connected at the first point 1231, the second point 1232, or the third point 1233, an electrical length of the second radiator 1220 may gradually become short. The first point 1231, the second point 1232, or the third point 1233 may mean any point on the ground layer.

According to an embodiment, a switch (e.g., an SPDT switch) capable of connecting the ground layer and the second radiator 1220 may be disposed at each of the points 1231, 1232, and 1233 in the PCB 1210. A communication circuit (e.g., the communication circuit 270 of FIG. 1B) may control the switches to adjust an electrical length of the second radiator 1220. As such, the communication circuit 270 may adjust resonance frequencies of antennas 1310, 1320, and 1330 illustrated in FIG. 13.

Referring to FIGS. 12 and 13, a second radiator 1312 may correspond to the case where the second radiator 1220 is connected with the first point 1231, a second radiator 1322 to the case where the second radiator 1220 is connected with the second point 1232, and a second radiator 1332 to the case where the second radiator 1220 is connected with the third point 1233. According to the embodiments illustrated in FIG. 13, as a length of the second radiator 1312 decreases, electrical paths of the antennas 1310, 1320, and 1330 may vary. For example, a length of the second radiator 1322 may be shorter than a length of the second radiator 1312. Also, a length of the second radiator 1332 may be shorter than the length of the second radiator 1322.

According to an embodiment, because the length of the second radiator 1322 is shorter than the length of the second radiator 1312, an electrical path of the antenna 1320 may be shorter than that of the antenna 1310. Because a length of the second radiator 1332 is shorter than the length of the second radiator 1322, an electrical path of the antenna 1330 may be shorter than that of the antenna 1320.

According to an embodiment, because the electrical paths of the antennas 1310, 1320, and 1330 gradually become short, resonant frequencies of the antennas 1310, 1320, and 1330 may gradually become high. Referring to FIG. 14, a graph 1410 indicates a reflection coefficient of the antenna 1310, a graph 1420 indicates a reflection coefficient of the antenna 1320, and a graph 1430 indicates a reflection coefficient of the antenna 1330. Comparing the graph 1410 and the graph 1420, because an electrical path of the antenna 1320 is shorter than the electrical path of the antenna 1310, a resonant frequency of the antenna 1320 may be higher than a resonant frequency of the antenna 1310. Comparing the graph 1420 and the graph 1430, because an electrical path of the antenna 1330 is shorter than the electrical path of the antenna 1320, a resonant frequency of the antenna 1330 may be higher than the resonant frequency of the antenna 1320.

Figure 15:
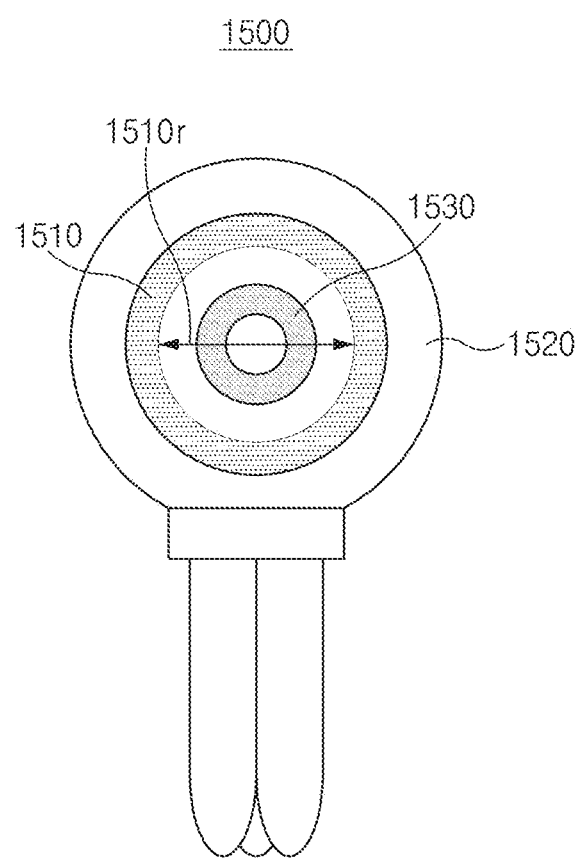
FIG. 15 illustrates an electronic device in which a diameter of a third radiator is marked, according to an embodiment.
Figure 16:
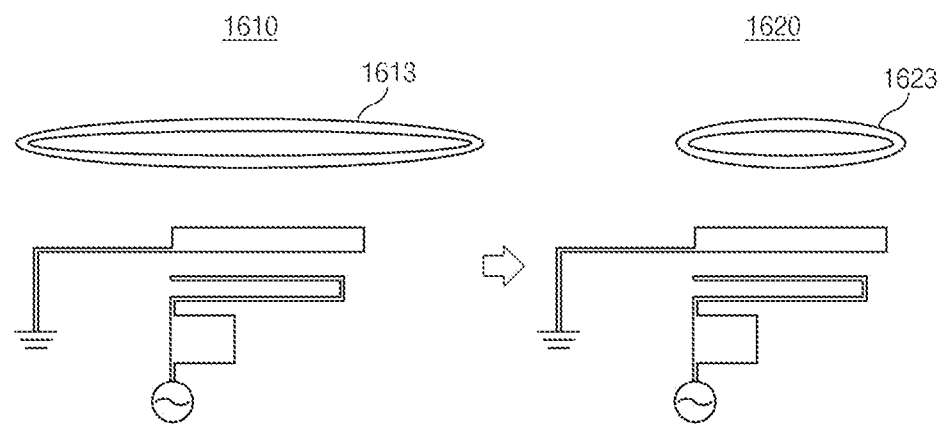
FIG. 16 illustrates antennas in which a diameter of a third radiator gradually decreases, according to various embodiments.

FIG. 15 illustrates an electronic device in which a diameter of a third radiator is marked, according to an embodiment. FIG. 16 illustrates antennas in which a diameter of a third radiator gradually decreases, according to various embodiments. Antennas illustrated in FIG. 16 indicate antennas 1610 and 1620 where an electrical path is changed as a diameter of a third radiator 1510 illustrated in FIG. 15 is changed.

Referring to FIG. 15, a diameter 1510r of the third radiator 1510 may gradually decrease (or increase). For example, the diameter 1510r of the third radiator 1510 may be smaller than a diameter of a housing 1520 and may be greater than a diameter of a camera 1530. Because the diameter 1510r of the third radiator 1510 is greater than the diameter of the camera 1530, the camera 1530 may photograph an image through the third radiator 1510.

Referring to FIGS. 15 and 16, a third radiator 1613 indicates the case where the diameter 1510r of the third radiator 1510 is similar to the diameter of the housing 1520, and a third radiator 1623 indicates the case where the diameter 1510r of the third radiator 1510 is similar to the diameter of the camera 1530. For example, a diameter of the third radiator 1613 of the antenna 1610 may be greater than a diameter of the third radiator 1623 of the antenna 1620.

According to the embodiments illustrated in FIG. 16, as a diameter of the third radiator 1613 decreases, electrical paths of the antennas 1610 and 1620 may vary. For example, because the diameter of the third radiator 1623 is smaller than the diameter of the third radiator 1613, the electrical path of the antenna 1620 may be shorter than the electrical path of the antenna 1610.

According to an embodiment, in the case where the electrical paths of the antennas 1610 and 1620 become short, resonant frequencies of the antennas 1610 and 1620 may become high. For example, the resonant frequency of the antenna 1620 may be higher than the resonant frequency of the antenna 1610.

Figure 17:
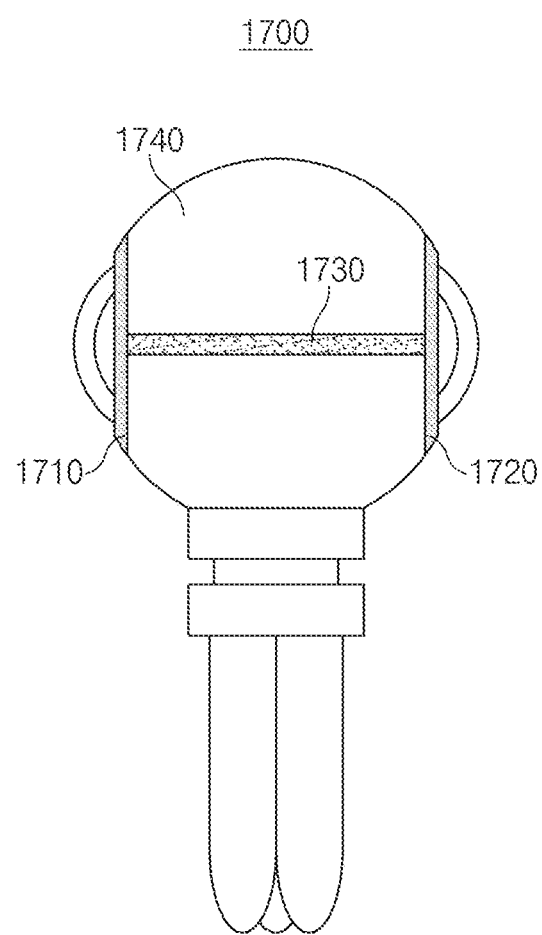
FIG. 17 illustrates an electronic device where a conductive material is disposed at a housing, according to an embodiment.
Figure 18:
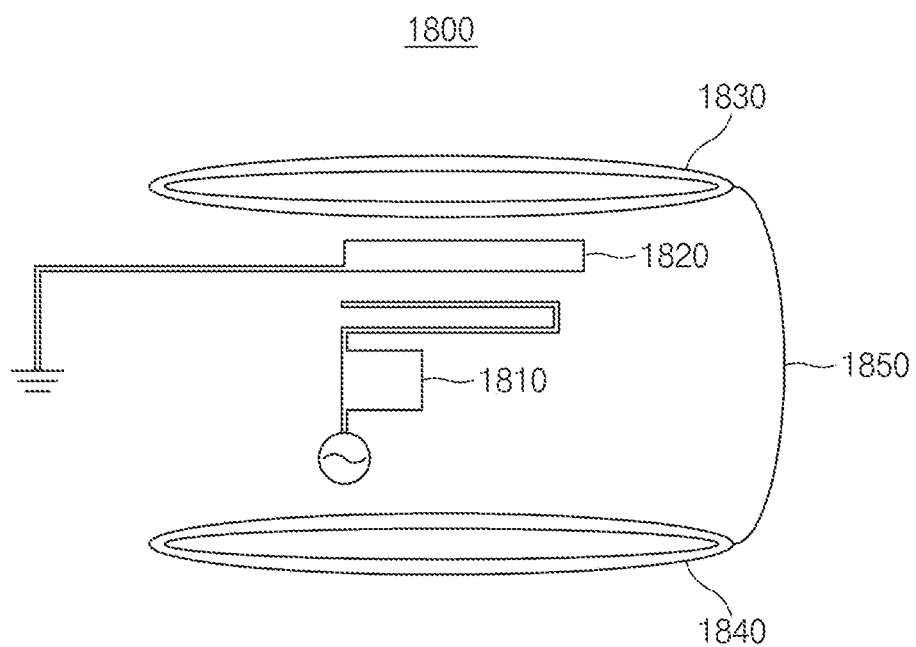
FIG. 18 illustrates an antenna including an additional radiator, according to an embodiment.

FIG. 17 illustrates an electronic device where a conductive material is disposed at a housing, according to an embodiment. FIG. 18 illustrates an antenna including an additional radiator, according to an embodiment. An antenna 1800 illustrated in FIG. 18 indicates an antenna included in an electronic device 1700 illustrated in FIG. 17.

Referring to FIG. 17, the electronic device 1700 may further include an additional radiator 1720. The additional radiator 1720 may be a radiator disposed on one side of a housing 1740, which faces away from a third radiator 1710. For another example, the additional radiator 1720 may be a radiator that is substantially identical to the third radiator 1710.

According to an embodiment, the third radiator 1710 and the additional radiator 1720 may be electrically connected. For example, the third radiator 1710 and the additional radiator 1720 may be connected through a conductive material 1730 (or a conductive line). For example, when the communication circuit 270 feeds a power to a first radiator (e.g., 1810 of FIG. 18), the first radiator 1810 and a second radiator (e.g., 1820 of FIG. 18) may be electromagnetically connected. The second radiator 1820 and the third radiator 1710 may also be electromagnetically connected by the coupling. A radiation current may flow at the third radiator 1710 electromagnetically connected with the second radiator, and the radiation current may also flow at the additional radiator 1720 through the conductive material 1730.

Referring to FIG. 18, a third radiator 1830, an additional radiator 1840, and a conductive material 1850 may correspond to the third radiator 1710, the additional radiator 1720, and the conductive material 1730 illustrated in FIG. 17, respectively. According to the embodiment illustrated in FIG. 18, as the third radiator 1830 is electrically connected with the additional radiator 1840, an electrical path of the antenna 1800 may vary. For example, an electrical path of the antenna 1800 when the additional radiator 1840 is connected may be longer than that before the additional radiator 1840 is connected.

According to an embodiment, in the case where the electrical path of the antenna 1800 increases, a resonant frequency thereof may become lower. For example, a resonant frequency of the antenna 1800 when the additional radiator 1840 is connected may be lower than that before the additional radiator 1840 is connected.

Figure 19:
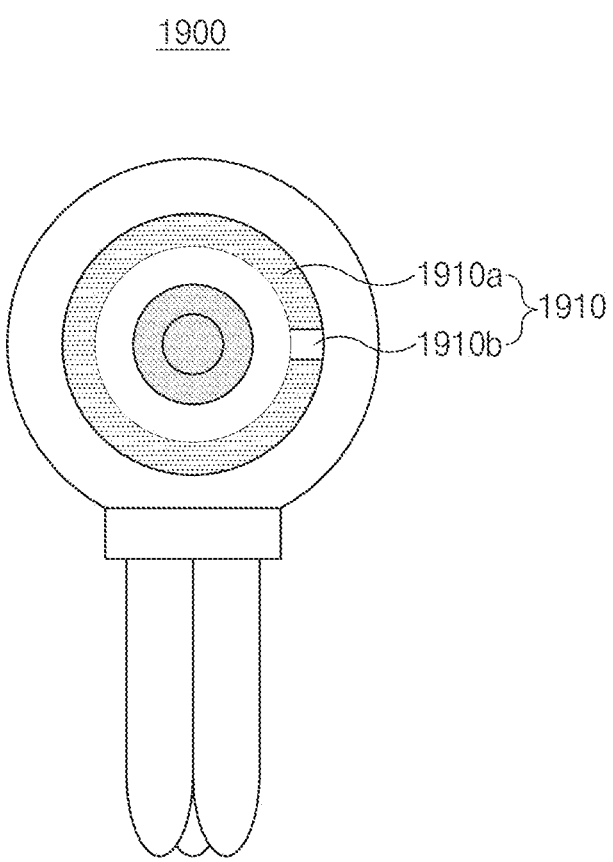
FIG. 19 illustrates an electronic device including a segment region according to an embodiment.
Figure 20:
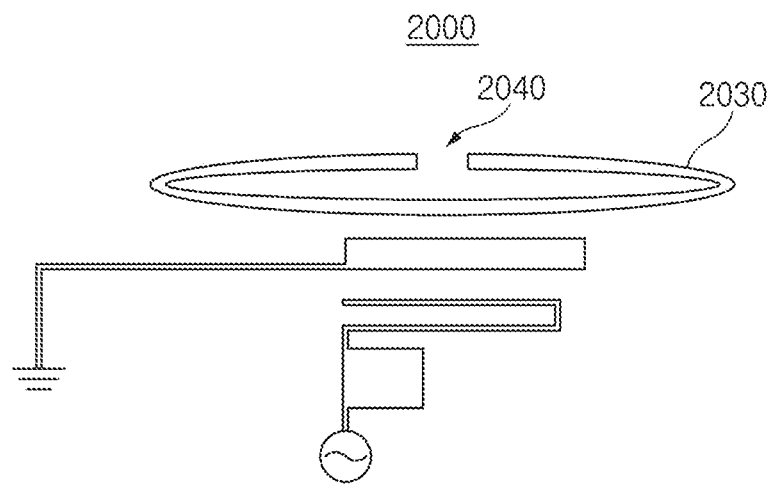
FIG. 20 illustrates an antenna including a segmented third radiator according to an embodiment.

FIG. 19 illustrates an electronic device including a segment region according to an embodiment. FIG. 20 illustrates an antenna including a segmented third radiator according to an embodiment. An antenna 2000 illustrated in FIG. 20 indicates an antenna included in an electronic device 1900 illustrated in FIG. 19.

Referring to FIG. 19, a decoration 1910 may be segmented. For example, the decoration 1910 may include a first region 1910a and a second region 1910b. The first region 1910a may operate as a third radiator. An empty space may be formed in the second region 1910b, and an insulating material such as plastic may be disposed therein.

Referring to FIG. 20, a third radiator 2030 and a segment region 2040 may correspond to the first region 1910a and the second region 1910b illustrated in FIG. 19, respectively. According to the embodiment illustrated in FIG. 20, as the decoration 1910 is segmented, an electrical path of the antenna 2000 may vary. For example, an electrical path of the antenna 2000 may increase or decrease depending on locations of a feed part (e.g., a coupling point) and the segment region 2040.

Figure 21:
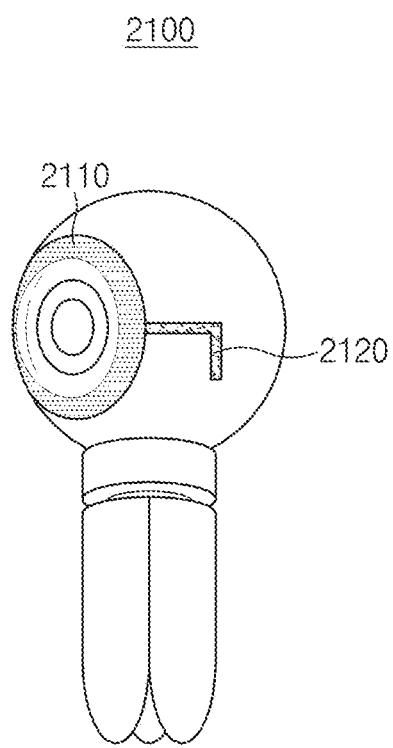
FIG. 21 illustrates an electronic device where a conductive member is disposed at a housing, according to an embodiment.
Figure 22:
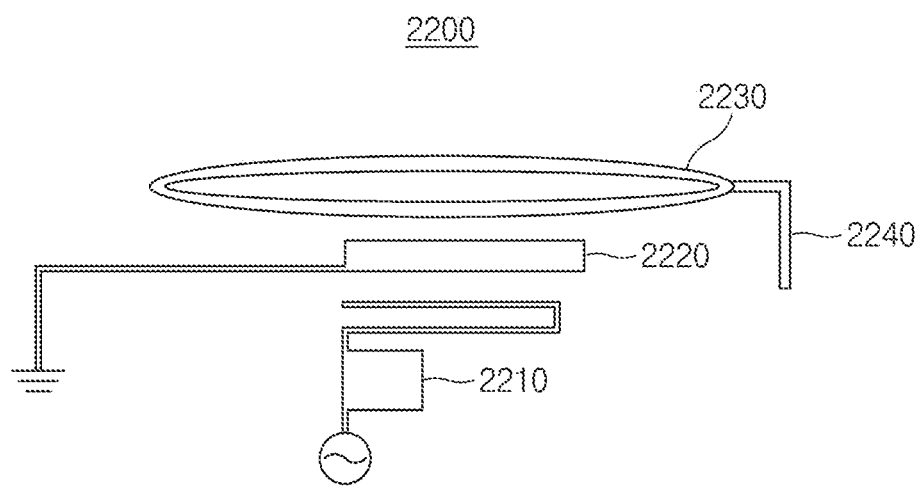
FIG. 22 illustrates an antenna including a conductive member, according to an embodiment.

FIG. 21 illustrates an electronic device where a conductive member is disposed at a housing, according to an embodiment. FIG. 22 illustrates an antenna including a conductive member, according to an embodiment. An antenna 2200 illustrated in FIG. 22 indicates an antenna included in an electronic device 2100 illustrated in FIG. 21.

Referring to FIG. 21, the electronic device 2100 may further include a conductive member 2120. The conductive member 2120 may be extended from one point of a third radiator 2110. The conductive member 2120 may be extended along a surface of a housing 2130 from one point of the third radiator 2110. The conductive member 2120 may be extended from one point of the third radiator 2110 to the interior of the housing 2130.

According to an embodiment, when a radiation current flows at the third radiator 2110, the radiation current may also flow at the conductive member 2120. For example, when a communication circuit (e.g., the communication circuit 270 of FIG. 2) feeds a power to a first radiator (e.g., 2210 of FIG. 22), the first radiator 2210 and a second radiator (e.g., 2220 of FIG. 22) may be electromagnetically connected by the coupling. The second radiator 2220 and the third radiator 2110 may be electromagnetically connected by the coupling. A radiation current may flow at the third radiator 2110 electromagnetically connected with the second radiator 2220, and the radiation current may also flow through the conductive member 2120.

Referring to FIG. 22, a third radiator 2230 and a conductive member 2240 may correspond to the third radiator 2110 and the conductive member 2120 illustrated in FIG. 21, respectively. According to an embodiment, as the third radiator 2230 and the conductive member 2240 are electrically connected, an electrical path of the antenna 2200 may vary. For example, an electrical path of the antenna 2200 when the conductive member 2240 is connected may be longer than that before the conductive member 2240 is connected.

According to an embodiment, in the case where the electrical path of the antenna 2200 increases, a resonant frequency thereof may become lower. For example, a resonant frequency of the antenna 2200 when the conductive member 2240 is connected may be lower than that before the conductive member 2240 is connected.

Figure 23:
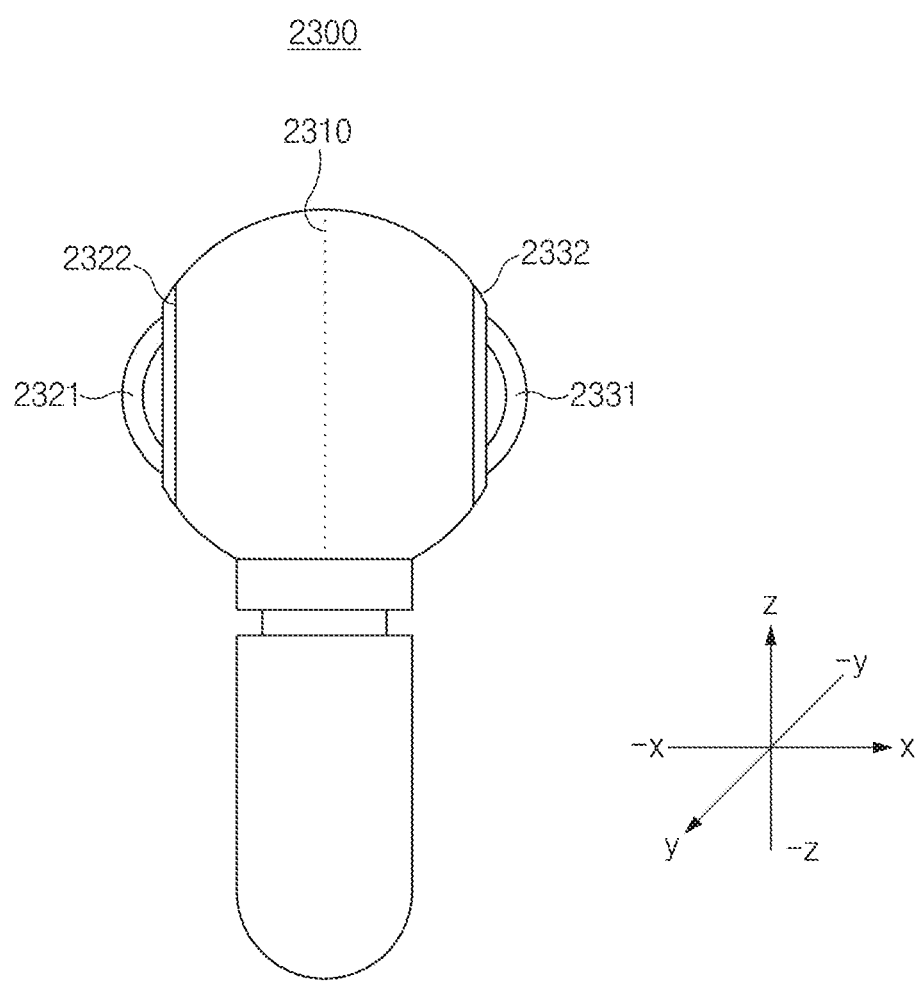
FIG. 23 illustrates a side view of an electronic device according to an embodiment.
Figure 24:
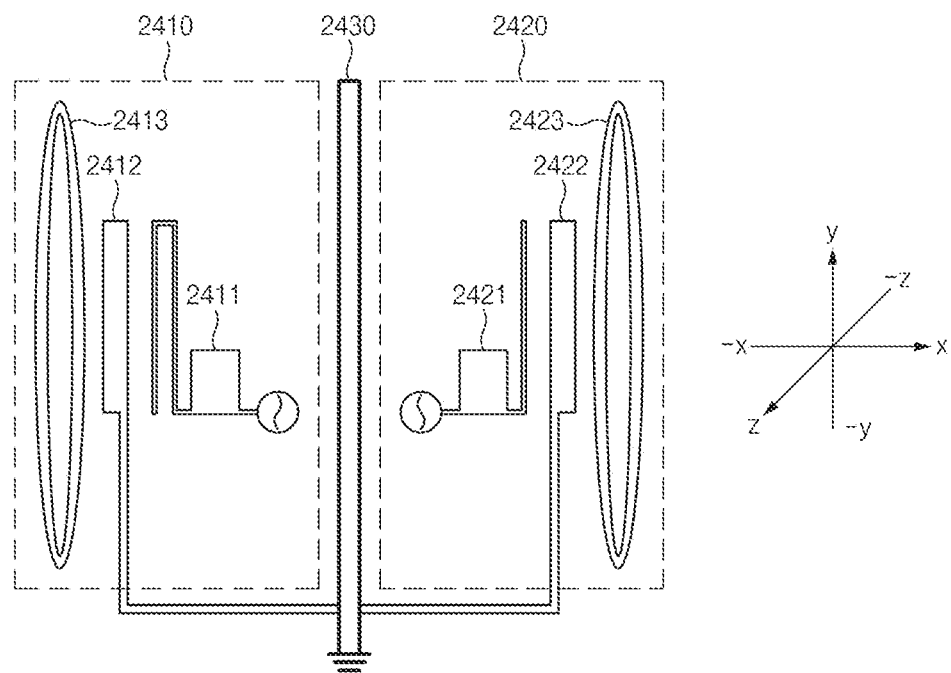
FIG. 24 illustrates antennas having a symmetrical structure according to an embodiment.

FIG. 23 illustrates a side view of an electronic device according to an embodiment. FIG. 24 illustrates antennas having a symmetrical structure according to an embodiment. Antennas 2410 and 2420 illustrated in FIG. 24 indicate antennas included in an electronic device 2300 illustrated in FIG. 23.

Referring to FIG. 23, the electronic device 2300 may include a symmetrical structure. For example, components disposed to face a negative x-direction and components disposed to face a positive x-direction may be substantially identical with respect to a first surface 2310. For example, cover glasses 2321 and 2331, cameras, decorations 2322 and 2332, and FPCBs may be disposed to face the negative x-direction and the positive x-direction with respect to the first surface 2310.

Referring to FIG. 24, an antenna 2410 disposed to face the negative x-direction with respect to a PCB 2430 and an antenna 2420 disposed to face the positive x-direction with respect to the PCB 2430 may transmit/receive signals in different frequency bands. According to an embodiment, a communication circuit (e.g., the communication circuit 270 of FIG. 2) may feed a power to a first radiator 2411. A second radiator 2412 may be electromagnetically connected with the first radiator 2411 by the coupling. A third radiator 2413 may be electromagnetically connected with the second radiator 2412 by the coupling. Because the first radiator 2411, the second radiator 2412, and the third radiator 2413 are electromagnetically connected, a radiation current may also flow at the second radiator 2412 and the third radiator 2413. For example, the antenna 2410 disposed to face the negative x-direction may transmit/receive a signal in a first frequency band (e.g., 700 MHz).

According to an embodiment, the communication circuit 270 may feed the power to a fourth radiator 2421. A fifth radiator 2422 may be electromagnetically connected with the fourth radiator 2421 by the coupling. A sixth radiator 2423 may be electromagnetically connected with the fifth radiator 2422 by the coupling. Because the fourth radiator 2421, the fifth radiator 2422, and the sixth radiator 2423 are electromagnetically connected, a radiation current may also flow at the fifth radiator 2422 and the sixth radiator 2423. For example, the antenna 2420 disposed to face the positive x-direction may transmit/receive a signal a second frequency band (e.g., 5 GHz).

Figure 25:
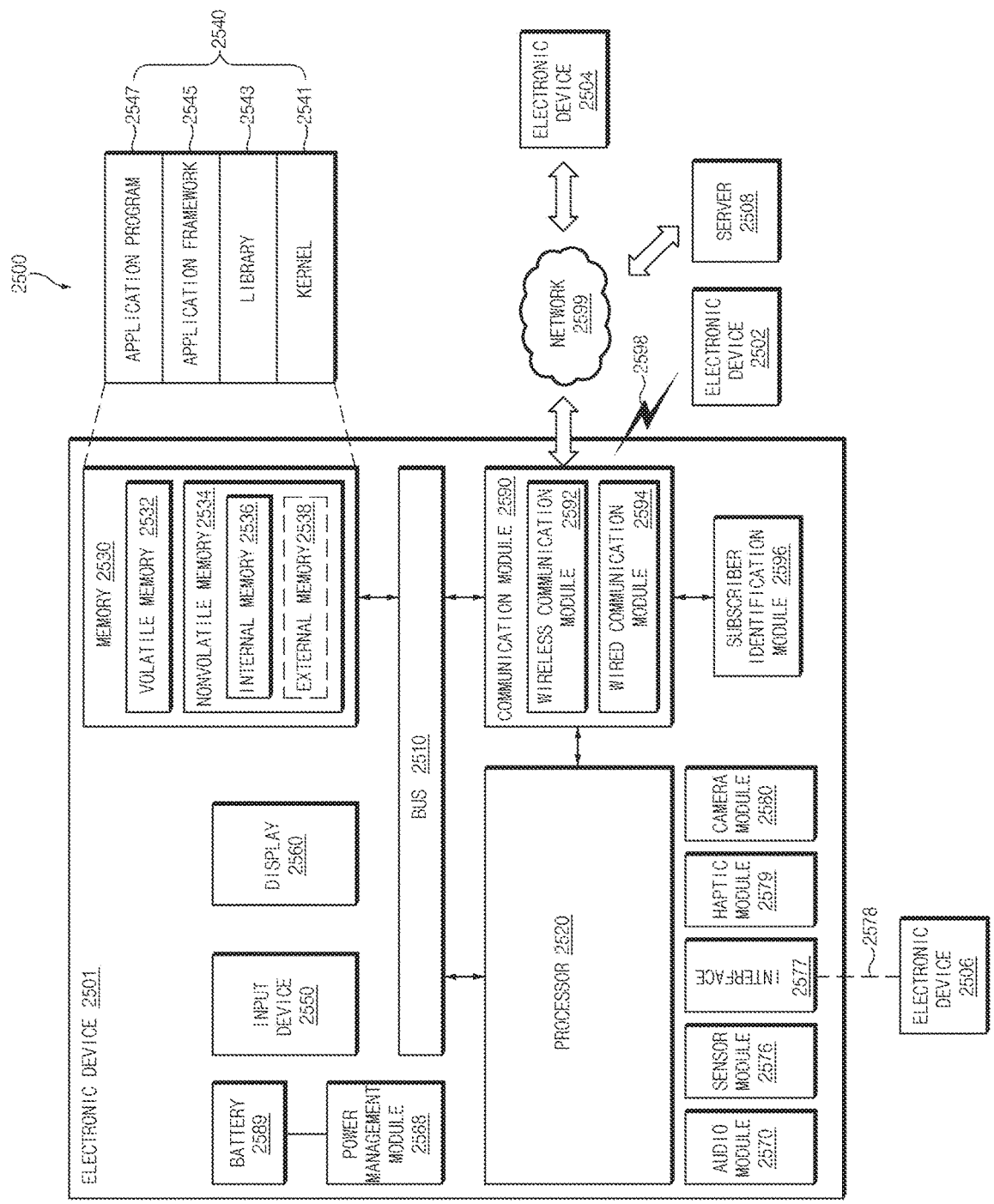
FIG. 25 is a block diagram of an electronic device in a network environment according to various embodiments.

FIG. 25 illustrates an electronic device 2501 in a network environment 2500, according to various embodiments.

An electronic device according to various embodiments of the disclosure may include various forms of devices. For example, the electronic device may include at least one of, for example, portable communication devices (e.g., smartphones), computer devices (e.g., personal digital assistants (PDAs), tablet personal computers (PCs), laptop PCs, desktop PCs, workstations, or servers), portable multimedia devices (e.g., electronic book readers or Motion Picture Experts Group (MPEG-1 or MPEG-2) Audio Layer 3 (MP3) players), portable medical devices (e.g., heartbeat measuring devices, blood glucose monitoring devices, blood pressure measuring devices, and body temperature measuring devices), cameras, or wearable devices. The wearable device may include at least one of an accessory type (e.g., watches, rings, bracelets, anklets, necklaces, glasses, contact lens, or head-mounted-devices (HMDs)), a fabric or garment-integrated type (e.g., an electronic apparel), a body-attached type (e.g., a skin pad or tattoos), or a bio-implantable type (e.g., an implantable circuit). According to various embodiments, the electronic device may include at least one of, for example, televisions (TVs), digital versatile disk (DVD) players, audios, audio accessory devices (e.g., speakers, headphones, or headsets), refrigerators, air conditioners, cleaners, ovens, microwave ovens, washing machines, air cleaners, set-top boxes, home automation control panels, security control panels, game consoles, electronic dictionaries, electronic keys, camcorders, or electronic picture frames.

In another embodiment, the electronic device may include at least one of navigation devices, satellite navigation system (e.g., Global Navigation Satellite System (GNSS)), event data recorders (EDRs) (e.g., black box for a car, a ship, or a plane), vehicle infotainment devices (e.g., head-up display for vehicle), industrial or home robots, drones, automated teller machines (ATMs), points of sales (POSs), measuring instruments (e.g., water meters, electricity meters, or gas meters), or internet of things (e.g., light bulbs, sprinkler devices, fire alarms, thermostats, or street lamps). The electronic device according to an embodiment of the disclosure may not be limited to the above-described devices, and may provide functions of a plurality of devices like smartphones which have measurement function of personal biometric information (e.g., heart rate or blood glucose). In the disclosure, the term "user" may refer to a person who uses an electronic device or may refer to a device (e.g., an artificial intelligence electronic device) that uses the electronic device.

Referring to FIG. 25, under the network environment 2500, the electronic device 2501 (e.g., the electronic device 100 of FIG. 1) may communicate with an electronic device 2502 through short-range wireless communication 2598 or may communication with an electronic device 2504 or a server 2508 through a network 2599. According to an embodiment, the electronic device 2501 may communicate with the electronic device 2504 through the server 2508.

According to an embodiment, the electronic device 2501 may include a bus 2510, a processor 2520, a memory 2530, an input device 2550 (e.g., a micro-phone or a mouse), a display device 2560, an audio module 2570, a sensor module 2576, an interface 2577, a haptic module 2579, a camera module 2580, a power management module 2588, a battery 2589, a communication module 2590 (e.g., the communication circuit 270), and a subscriber identification module 2596. According to an embodiment, the electronic device 2501 may not include at least one (e.g., the display device 2560 or the camera module 2580) of the above-described components or may further include other component(s).

The bus 2510 may interconnect the above-described components 2520 to 2590 and may include a circuit for conveying signals (e.g., a control message or data) between the above-described components.

The processor 2520 may include one or more of a central processing unit (CPU), an application processor (AP), a graphic processing unit (GPU), an image signal processor (ISP) of a camera or a communication processor (CP). According to an embodiment, the processor 2520 may be implemented with a system on chip (SoC) or a system in package (SiP). For example, the processor 2520 may drive an operating system (OS) or an application program to control at least one of another component (e.g., hardware or software component) of the electronic device 2501 connected to the processor 2520 and may process and compute various data. The processor 2520 may load a command or data, which is received from at least one of other components (e.g., the communication module 2590), into a volatile memory 2532 to process the command or data and may store the result data into a nonvolatile memory 2534.

The memory 2530 may include, for example, the volatile memory 2532 or the nonvolatile memory 2534. The volatile memory 2532 may include, for example, a random access memory (RAM) (e.g., a dynamic RAM (DRAM), a static RAM (SRAM), or a synchronous DRAM (SDRAM)). The nonvolatile memory 2534 may include, for example, a programmable read-only memory (PROM), an one time PROM (OTPROM), an erasable PROM (EPROM), an electrically EPROM (EEPROM), a mask ROM, a flash ROM, a flash memory, a hard disk drive (HDD), or a solid-state drive (SSD). In addition, the nonvolatile memory 2534 may be configured in the form of an internal memory 2536 or the form of an external memory 2538 which is available through connection only if necessary, according to the connection with the electronic device 2501. The external memory 2538 may further include a flash drive such as compact flash (CF), secure digital (SD), micro secure digital (Micro-SD), mini secure digital (Mini-SD), extreme digital (xD), a multimedia card (MMC), or a memory stick. The external memory 2538 may be operatively or physically connected with the electronic device 2501 in a wired manner (e.g., a cable or a universal serial bus (USB)) or a wireless (e.g., Bluetooth) manner.

For example, the memory 2530 may store, for example, at least one different software component, such as a command or data associated with the program 2540, of the electronic device 2501. The program 2540 may include, for example, a kernel 2541, a library 2543, an application framework 2545 or an application program (interchangeably, "application") 2547.

The input device 2550 may include a microphone, a mouse, or a keyboard. According to an embodiment, the keyboard may include a keyboard physically connected or a virtual keyboard displayed through the display device 2560.

The display device 2560 may include a display, a hologram device or a projector, and a control circuit to control a relevant device. The display may include, for example, a liquid crystal display (LCD), a light emitting diode (LED) display, an organic LED (OLED) display, a microelectromechanical systems (MEMS) display, or an electronic paper display. According to an embodiment, the display may be flexibly, transparently, or wearably implemented. The display may include a touch circuitry, which is able to detect a user's input such as a gesture input, a proximity input, or a hovering input or a pressure sensor (interchangeably, a force sensor) which is able to measure the intensity of the pressure by the touch. The touch circuit or the pressure sensor may be implemented integrally with the display or may be implemented with at least one sensor separately from the display. The hologram device may show a stereoscopic image in a space using interference of light. The projector may project light onto a screen to display an image. The screen may be located inside or outside the electronic device 2501.

The audio module 2570 may convert, for example, from a sound into an electrical signal or from an electrical signal into the sound. According to an embodiment, the audio module 2570 may acquire sound through the input device 2550 (e.g., a microphone) or may output sound through an output device (not illustrated) (e.g., a speaker or a receiver) included in the electronic device 2501, an external electronic device (e.g., the electronic device 2502 (e.g., a wireless speaker or a wireless headphone)) or an electronic device 2506 (e.g., a wired speaker or a wired headphone) connected with the electronic device 2501

The sensor module 2576 may measure or detect, for example, an internal operating state (e.g., power or temperature) of the electronic device 2501 or an external environment state (e.g., an altitude, a humidity, or brightness) to generate an electrical signal or a data value corresponding to the information of the measured state or the detected state. The sensor module 2576 may include, for example, at least one of a gesture sensor, a gyro sensor, a barometric pressure sensor, a magnetic sensor, an acceleration sensor, a grip sensor, a proximity sensor, a color sensor (e.g., a red, green, blue (RGB) sensor), an infrared sensor, a biometric sensor (e.g., an iris sensor, a fingerprint senor, a heartbeat rate monitoring (HRM) sensor, an e-nose sensor, an electromyography (EMG) sensor, an electroencephalogram (EEG) sensor, an electrocardiogram (ECG) sensor), a temperature sensor, a humidity sensor, an illuminance sensor, or an UV sensor. The sensor module 2576 may further include a control circuit for controlling at least one or more sensors included therein. According to an embodiment, the electronic device 2501 may control the sensor module 2576 by using the processor 2520 or a processor (e.g., a sensor hub) separate from the processor 2520. In the case that the separate processor (e.g., a sensor hub) is used, while the processor 2520 is in a sleep state, the separate processor may operate without awakening the processor 2520 to control at least a portion of the operation or the state of the sensor module 2576.

According to an embodiment, the interface 2577 may include a high definition multimedia interface (HDMI), a universal serial bus (USB), an optical interface, a recommended standard 232 (RS-232), a D-subminiature (D-sub), a mobile high-definition link (MHL) interface, a SD card/MMC(multi-media card) interface, or an audio interface. A connector 2578 may physically connect the electronic device 2501 and the electronic device 2506. According to an embodiment, the connector 2578 may include, for example, an USB connector, an SD card/MMC connector, or an audio connector (e.g., a headphone connector).

The haptic module 2579 may convert an electrical signal into mechanical stimulation (e.g., vibration or motion) or into electrical stimulation. For example, the haptic module 2579 may apply tactile or kinesthetic stimulation to a user. The haptic module 2579 may include, for example, a motor, a piezoelectric element, or an electric stimulator.

The camera module 2580 may capture, for example, a still image and a moving picture. According to an embodiment, the camera module 2580 may include at least one lens (e.g., a wide-angle lens and a telephoto lens, or a front lens and a rear lens), an image sensor, an image signal processor, or a flash (e.g., a light emitting diode or a xenon lamp).

The power management module 2588, which is to manage the power of the electronic device 2501, may constitute at least a portion of a power management integrated circuit (PMIC).

The battery 2589 may include a primary cell, a secondary cell, or a fuel cell and may be recharged by an external power source to supply power at least one component of the electronic device 2501.

The communication module 2590 may establish a communication channel between the electronic device 2501 and an external device (e.g., the first external electronic device 2502, the second external electronic device 2504, or the server 2508). The communication module 2590 may support wired communication or wireless communication through the established communication channel According to an embodiment, the communication module 2590 may include a wireless communication module 2592 or a wired communication module 2594. The communication module 2590 may communicate with the external device through a first network 2598 (e.g. a short range communication network such as Bluetooth or infrared data association (IrDA)) or a second network 2599 (e.g., a wireless wide area network such as a cellular network) through a relevant module among the wireless communication module 2592 or the wired communication module 2594.

The wireless communication module 2592 may support, for example, cellular communication, short-range wireless communication, global navigation satellite system (GNSS) communication. The cellular communication may include, for example, long-term evolution (LTE), LTE Advance (LTE-A), code division multiple access (CDMA), wideband CDMA (WCDMA), universal mobile telecommunications system (UMTS), Wireless Broadband (WiBro), or Global System for Mobile Communications (GSM). The short-range wireless communication may include wireless fidelity (Wi-Fi), Wi-Fi Direct, light fidelity (Li-Fi), Bluetooth, Bluetooth low energy (BLE), Zigbee, near field communication (NFC), magnetic secure transmission (MST), radio frequency (RF), or a body area network (BAN). The GNSS may include at least one of a Global Positioning System (GPS), a Global Navigation Satellite System (Glonass), Beidou Navigation Satellite System (Beidou), the European global satellite-based navigation system (Galileo), or the like. In the disclosure, "GPS" and "GNSS" may be interchangeably used.

According to an embodiment, when the wireless communication module 2592 supports cellar communication, the wireless communication module 2592 may, for example, identify or authenticate the electronic device 2501 within a communication network using the subscriber identification module (e.g., a SIM card) 2596. According to an embodiment, the wireless communication module 2592 may include a communication processor (CP) separate from the processor 2520 (e.g., an application processor (AP)). In this case, the communication processor may perform at least a portion of functions associated with at least one of components 2510 to 2596 of the electronic device 2501 in substitute for the processor 2520 when the processor 2520 is in an inactive (sleep) state, and together with the processor 2520 when the processor 2520 is in an active state. According to an embodiment, the wireless communication module 2592 may include a plurality of communication modules, each supporting only a relevant communication scheme among cellular communication, short-range wireless communication, or a GNSS communication.

The wired communication module 2594 may include, for example, a local area network (LAN) service, a power line communication, or a plain old telephone service (POTS).

For example, the first network 2598 may employ, for example, Wi-Fi direct or Bluetooth for transmitting or receiving commands or data through wireless direct connection between the electronic device 2501 and the first external electronic device 2502. The second network 2599 may include a telecommunication network (e.g., a computer network such as a LAN or a WAN, the Internet or a telephone network) for transmitting or receiving commands or data between the electronic device 2501 and the second electronic device 2504.

According to various embodiments, the commands or the data may be transmitted or received between the electronic device 2501 and the second external electronic device 2504 through the server 2508 connected with the second network 2599. Each of the first and second external electronic devices 2502 and 2504 may be a device of which the type is different from or the same as that of the electronic device 2501. According to various embodiments, all or a part of operations that the electronic device 2501 will perform may be executed by another or a plurality of electronic devices (e.g., the electronic devices 2502 and 2504 or the server 2508). According to an embodiment, in the case that the electronic device 2501 executes any function or service automatically or in response to a request, the electronic device 2501 may not perform the function or the service internally, but may alternatively or additionally transmit requests for at least a part of a function associated with the electronic device 2501 to any other device (e.g., the electronic device 2502 or 2504 or the server 2508). The other electronic device (e.g., the electronic device 2502 or 2504 or the server 2508) may execute the requested function or additional function and may transmit the execution result to the electronic device 2501. The electronic device 2501 may provide the requested function or service using the received result or may additionally process the received result to provide the requested function or service. To this end, for example, cloud computing, distributed computing, or client-server computing may be used.

Figure 26:
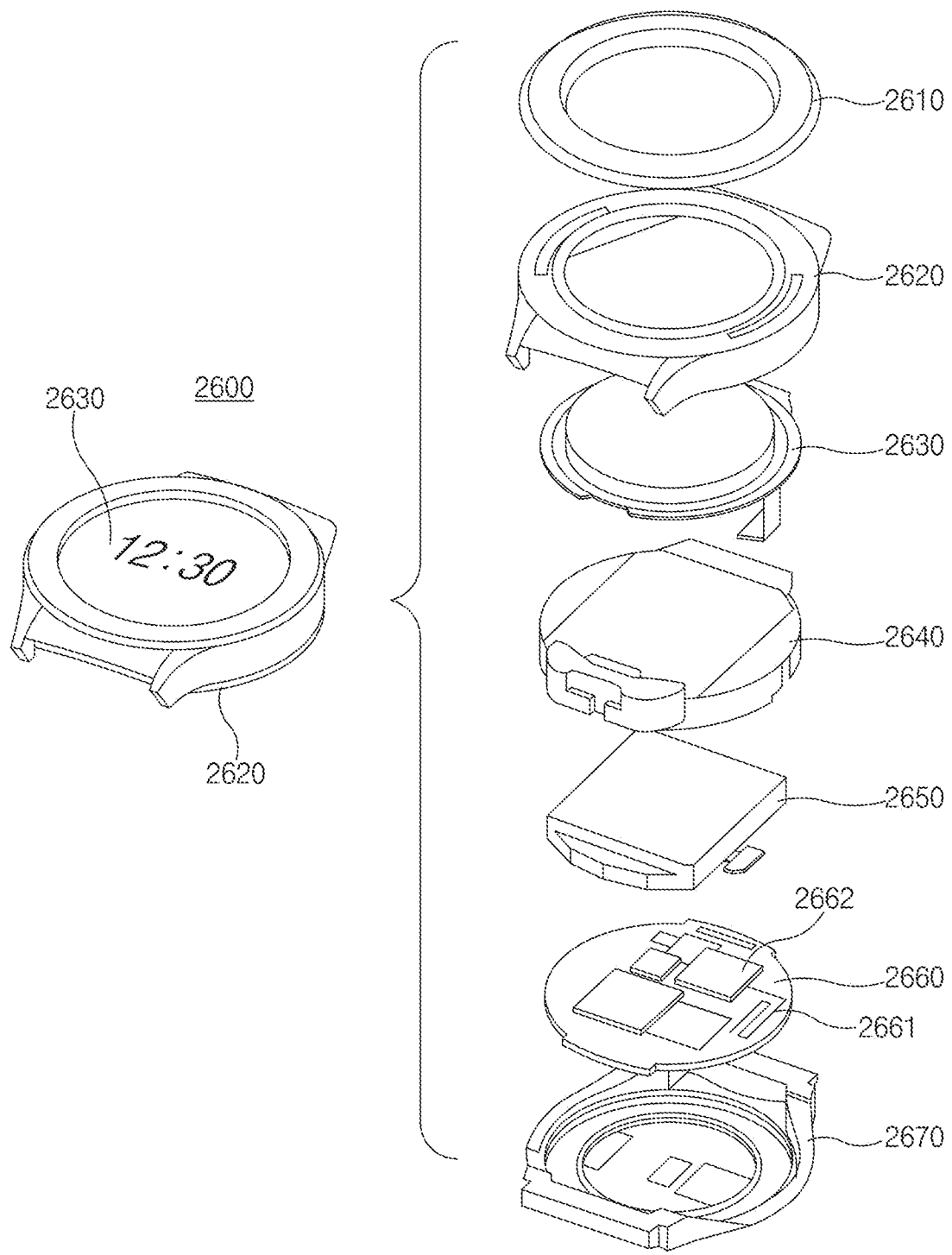
FIG. 26 is an exploded perspective view of an electronic device, according to various embodiments.

FIG. 26 is an exploded perspective view of an electronic device, according to various embodiments.

Referring to FIG. 26, an electronic device 2600 (e.g., the electronic device 2501 of FIG. 25) may include a decoration (e.g., a bezel wheel) 2610, a housing 2620, a display 2630, a bracket 2640, a battery 2650, a PCB 2660, a first radiator 2661, a communication circuit 2662, and a rear cover 2670.

According to an embodiment, the decoration 2610 may prevent a black matrix (BM) region of the display 2630 from being exposed to the outside. For another example, the decoration 2610 may generate a user input by rotation. According to an embodiment, the decoration 2610 (e.g., the conductive member 2240 of FIG. 22 or the third radiator 2230 of FIG. 22) including a conductive material may operate as a radiator of an antenna or may have an influence on the antenna.

According to an embodiment, at least a portion of the housing 2620 may include a conductive material (e.g., metal). For example, the housing 2620 may include a metal frame formed of metal. The metal frame may be formed above the display 2630 (e.g., around a through hole or around the decoration) or may be formed at a location (e.g., a side wall of he housing 2620) identical or similar to the PCB 2660. A resonance characteristic may vary depending on the location of the metal frame. According to an embodiment, at least a portion of the housing may operate as a radiator (e.g., the third radiator 2230 of FIG. 22) of an antenna.

According to an embodiment, the display 2630 may output an image or a text. For example, the display 2630 may be implemented in various types such as an LCD type, an OLED type, an OCTA type, or the like. In the case where the display 2630 includes a touch panel, the display 2630 may receive a touch input of a user and may transfer the received touch input to a processor disposed on the PCB 2660.

According to an embodiment, the display 2630 may include a signal line (e.g., the second radiator 2220 of FIG. 22) for transmitting/receiving data with the PCB 2660. A signal line (e.g., an FPCB) associated with supplying a signal to a panel of the display 2640, a signal line associated with supplying a signal to a touchscreen, a signal line for transmitting/receiving an NFC signal, or a signal line for a ground may be disposed at the display 2630.

According to an embodiment, the support member 2640 may fix the display 2630, the battery 2650, the PCB 2660, or the like mounted thereon. The support member 2640 may fix signal lines connecting components, which are mounted thereon. The support member 2640 may be implemented with a non-conductive material (e.g., plastic).

In an embodiment, the battery 2650 may be mounted on the support member 2640 and may be electrically connected with the PCB 2660. In the case where the battery 2650 is charged, the battery 2650 may output the charged power so as to be supplied to the electronic device 2600.

According to an embodiment, a module, a chip, or the like necessary to drive the electronic device 2600 may be mounted on the PCB 2660. For example, a processor, a memory, a communication circuit 2662, or the like may be mounted on the PCB 2660. In an embodiment, the PCB 2660 may include a ground layer connected with the first radiator 2661.

According to an embodiment, the communication circuit 2662 may be electrically connected with the first radiator 2661. The communication circuit 2662 may indirectly feed a power to a second radiator including a signal line for transmitting/receiving data of the PCB 2660 with the display 2630. For example, the communication circuit 2662 may feed a power to the first radiator 2661. A fed radiation current may flow along the first radiator 2661. When the radiation current flows at the first radiator 2661, the first radiator 2661 and the second radiator may be electromagnetically connected by the coupling. When the radiation current flows at the second radiator, the second radiator and a third radiator (e.g., at least a portion of the housing 2620 or the decoration 2610) may be electromagnetically connected by the coupling. As such, the radiation current may also flow at the third radiator. When the power is fed to or is indirectly fed to the radiators, the communication circuit 2662 may transmit/receive a signal in a specified frequency band (e.g., 2.4 GHz/5 GHz) through an electrical path that is formed by the first radiator 2661 to the third radiator.

In an embodiment, the rear cover 2670 may be coupled to the housing 2620 to fix and protect internal components. The rear cover 2670 may be formed of a nonmetal material or a non-conductive material.

An electronic device according to an embodiment of the disclosure may include a housing where an opening is formed, a printed circuit board (PCB) that is disposed in the housing, an insulating member that is coupled to the PCB, a first radiator that is formed on the insulating member, a camera that is electrically connected with the PCB and photographs an image through the opening, a decoration that surrounds the opening, a second radiator that includes at least a portion of the decoration, and a communication circuit that feeds a power to the first radiator, and the communication circuit may indirectly feed the power to the second radiator through the first radiator and may transmit/receive a signal in a specified frequency band through an electrical path formed by the first radiator and the second radiator.

The first radiator and the second radiator according to an embodiment of the disclosure may be electrically connected by a coupling.

The electronic device according to an embodiment of the disclosure may further include a flexible printed circuit board (FPCB) that is electrically connected with a ground layer disposed in the PCB, and a third radiator that includes at least a portion of the FPCB.

The communication circuit according to an embodiment of the disclosure may indirectly feed the power to the third radiator through the first radiator and may indirectly feed the power to the second radiator through the third radiator.

The communication circuit according to an embodiment of the disclosure may transmit/receive the signal in the specified frequency band through an electrical path formed by the first radiator, the third radiator, and the second radiator.

The third radiator and the second radiator according to an embodiment of the disclosure may be electrically connected by a coupling.

The decoration according to an embodiment of the disclosure may include a conductive member electrically coupled to the second radiator.

At least a portion of the second radiator according to an embodiment of the disclosure may be segmented.

The electronic device according to an embodiment of the disclosure may further include an additional decoration that is disposed on a side of the PCB, which faces away from the decoration, and is electrically connected with the decoration.

The communication circuit according to an embodiment of the disclosure may transmit/receive a signal in a frequency band different from the specified frequency band through an electrical path formed by the first radiator, the second radiator, and the additional decoration.

The electronic device according to an embodiment of the disclosure may further include an additional insulating member that is disposed on a side of the PCB, which faces away from the insulating member, and the communication circuit may transmit/receive a signal in a frequency band different from the specified frequency band through an electrical path formed by a third radiator formed on the additional insulating member and a fourth radiator including at least a portion of the additional decoration.

The communication circuit according to an embodiment of the disclosure may change a frequency for transmitting/receiving the signal based on a diameter of the decoration.

An electronic device according to an embodiment of the disclosure may include a housing where an opening is formed, a printed circuit board (PCB) that is disposed in the housing, an insulating member that is coupled to the PCB, a first radiator that is formed on the insulating member, a camera that is electrically connected with the PCB and is exposed through the opening, a decoration that surrounds the opening, a flexible printed circuit board (FPCB) that includes one end located between the first radiator and the decoration and an opposite end electrically connected with a ground layer in the PCB, a second radiator that includes at least a portion of the FPCB, a third radiator that includes at least a portion of the decoration, and a communication circuit that feeds a power to the first radiator, and the communication circuit may indirectly feed a power to the second radiator and the third radiator through the first radiator and may transmit/receive a signal in a specified frequency band through an electrical path formed by the first radiator, the second radiator, and the third radiator.

The communication circuit according to an embodiment of the disclosure may change a frequency for transmitting/receiving the signal based on a length of the second radiator.

The electronic device according to an embodiment of the disclosure may further include a switch that connects one point on the second radiator and the ground layer.

The second radiator according to an embodiment of the disclosure may be spaced from the ground layer.

The camera according to an embodiment of the disclosure may photograph an image through the opening.

The first radiator and the second radiator according to an embodiment of the disclosure may be electrically connected by a coupling.

The second radiator and the third radiator according to an embodiment of the disclosure may be electrically connected by a coupling.

The electronic device according to an embodiment of the disclosure may further include an additional decoration that is disposed on a side of the PCB, which faces away from the decoration, and is electrically connected with the decoration.

An electronic device according to an embodiment of the disclosure may include a housing, a first annular structure that is formed of a conductive material at a first region of the housing, a transparent plate that faces a first direction and fills the annular structure, a first camera module that is located in the housing and includes an image sensor facing the transparent plate, a physical button that is exposed through a second region of the housing and faces a second direction different from the first direction, a printed circuit board (PCB) that is located in the housing so as to be parallel to the transparent plate, an elongated flexible PCB that electrically connects the button and the PCB so as to surround a portion of the PCB and includes an elongated conductive layer electromagnetically connected with the annular structure by a coupling, a wireless communication circuit that is mounted on the PCB, and a conductive pattern that is located in the housing and is electrically connected with the communication circuit, the first camera module may be located between the transparent plate and the PCB, and a portion of the elongated conductive layer may be located between the conductive pattern and the annular structure.

The electronic device according to an embodiment of the disclosure may further include a second camera module that is disposed on a side of the PCB, which faces away from the first camera module.

The invention claimed is:

1. An electronic device comprising:
    a housing comprising an opening;
    a printed circuit board (PCB) disposed in the housing;
    an insulating member coupled to the PCB;
    a first radiator formed on the insulating member;
    a camera electrically connected to the PCB, the camera being configured to capture an image through the opening;
    a decoration surrounding the opening;
    a flexible printed circuit board (FPCB) comprising one end connected with the insulating member and an opposite end electrically connected with a ground layer in the PCB;
    a third radiator on at least a part of the FPCB;
    a second radiator comprising at least a portion of the decoration; and
    a communication circuit configured to:
        feed power to the first radiator,
        indirectly feed power to the second radiator through a first coupling between the first radiator and the third radiator and a second coupling between the third radiator and the second radiator, and
        at least one of transmit or receive a signal in a specified frequency band through a first electrical path formed by the first radiator, the third radiator, and the second radiator.

2. The electronic device of claim 1, wherein the decoration includes a conductive member electrically connected to the second radiator.

3. The electronic device of claim 1, wherein at least a portion of the second radiator is segmented.

4. The electronic device of claim 1, wherein the communication circuit is further configured to change a frequency for at least one of transmitting or receiving the signal based on a diameter of the decoration.

5. An electronic device comprising:
    a housing comprising an opening;
    a printed circuit board (PCB) disposed in the housing;
    an insulating member coupled to the PCB;
    a first radiator formed on the insulating member;
    a camera electrically connected to the PCB and being exposed through the opening;
    a decoration surrounding the opening;
    a flexible printed circuit board (FPCB) comprising one end located between the first radiator and the decoration and an opposite end electrically connected with a ground layer in the PCB;
    a second radiator comprising at least a portion of the FPCB;
    a third radiator including at least a portion of the decoration; and
    a communication circuit configured to:
        feed power to the first radiator,
        indirectly feed power to the second radiator and the third radiator through the first radiator, and
        at least one of transmit or receive a signal in a specified frequency band through an electrical path formed by the first radiator, the second radiator, and the third radiator.

6. The electronic device of claim 5, wherein the communication circuit is further configured to change a frequency for at least one of transmitting or receiving the signal based on a length of the second radiator.

7. The electronic device of claim 5, further comprising:
    a switch connecting one point on the second radiator to the ground layer.

* * * * *